US007048989B2

(12) United States Patent
Watkins et al.

(10) Patent No.: US 7,048,989 B2
(45) Date of Patent: May 23, 2006

(54) RETROREFLECTIVE ARTICLE COMPRISING WATER-BORNE ACRYLIC TOPCOATS

(75) Inventors: Robert F. Watkins, White Bear Lake, MN (US); Terry R. Bailey, Woodbury, MN (US); Joey L. Reule, Cottage Grove, MN (US); Scott A. Boyd, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 63 days.

(21) Appl. No.: 10/417,642

(22) Filed: Apr. 17, 2003

(65) Prior Publication Data

US 2004/0018344 A1 Jan. 29, 2004

Related U.S. Application Data

(60) Provisional application No. 60/429,781, filed on Nov. 27, 2002, provisional application No. 60/402,100, filed on Aug. 8, 2002, provisional application No. 60/374,443, filed on Apr. 18, 2002.

(51) Int. Cl.
*B32B 3/18* (2006.01)
*G02B 5/12* (2006.01)

(52) U.S. Cl. ............... 428/143; 428/522; 428/149; 428/325; 428/195.1; 359/539; 359/540; 359/541

(58) Field of Classification Search ............ 428/143, 428/149, 325, 195.1, 522; 359/539, 540, 359/541
See application file for complete search history.

(56) References Cited

U.S. PATENT DOCUMENTS

| 2,407,680 | A | 9/1946 | Palmquist et al. |
| 4,808,471 | A | 2/1989 | Grunzinger |
| 4,844,976 | A | 7/1989 | Huang |
| 5,378,575 | A | 1/1995 | Rajan et al. |
| 5,424,355 | A | 6/1995 | Uemae et al. |
| 5,450,235 | A | 9/1995 | Smith et al. |
| 5,508,105 | A | 4/1996 | Orensteen et al. |
| 5,610,215 | A | 3/1997 | Nonweiler et al. |
| 5,820,978 | A | 10/1998 | Huang |
| 6,020,416 | A | 2/2000 | Mazur et al. |
| 6,130,308 | A | 10/2000 | Rink et al. |

(Continued)

FOREIGN PATENT DOCUMENTS

| EP | 0 196 154 | 11/1991 |
| EP | 615 788 | 9/1994 |
| KR | 2004-0009618 | 1/2004 |
| WO | WO 00/58930 | 10/2000 |
| WO | WO 00/68714 | 11/2000 |
| WO | WO 02/31016 | 4/2002 |
| WO | WO 02/062894 | 8/2002 |

OTHER PUBLICATIONS

NeoResins, NeoCryl A-614 Data Sheet.

(Continued)

*Primary Examiner*—William P. Watkins, III
(74) *Attorney, Agent, or Firm*—Carolyn A. Fischer

(57) ABSTRACT

The invention relates to retroreflective articles such as retroreflective sheeting that comprises a core sheet comprising retroreflective elements and a topcoat wherein the topcoat comprises certain water-borne acrylic polymer(s).

32 Claims, 1 Drawing Sheet

U.S. PATENT DOCUMENTS

| | | | |
|---|---|---|---|
| 6,376,135 B1* | 4/2002 | Mehta et al. | 430/11 |
| 2003/0054139 A1 | 3/2003 | Ylitalo et al. | |
| 2003/0112311 A1* | 6/2003 | Naik et al. | 347/105 |
| 2003/0180541 A1 | 9/2003 | Naik et al. | |

OTHER PUBLICATIONS

NeoResins, NeoRez R-9649 Data Sheet.
NeoResins, Crosslinker CX-100 Data Sheet.
NeoResins, NeoCryl XK-220 Data Sheet.
NeoResins, Product Data Sheet: NeoCryl XK-95.
NeoResins, NeoCryl A-6015 Data Sheet.
NeoResins, NeoCryl XK-90 Data Sheet.
NeoResins, NeoCryl A-612 Data Sheet.
NeoResins, NeoCryl A-601 Data Sheet.
UCAR® Latex 419, Styrene Acrylic Polymer for Interior and Exterior Finishes, UCAR Emulsion Systems.
Michem® Prime EAA Dispersions, from Michem home page (www.michemprime.com), 14 pages.
Rohm and Haas Company, PRIMAL® E-2310H data sheet.
Rohm and Haas Company, RHOPLEX AC-1035 data sheet.
Rhom and Haas Company, Products for Printing and Paper Technologies, INKS, 2000.
UCAR Emulsion Systems, NeoCAR® Acrylic 850 data sheet.
Acronal Optive® 310, Architectural Coatings Raw Materials data sheet.
Textiles and Nonwovens, Rohm and Haas, RHOPLEX® GL-618, Elastomeric Acrylic Binder for Industrial Nonwovens, 1994.
Technical Data CARBOSET® GA-2136, Noveon The Specialty Chemicals Innovator™.
NeoResins, NeoCryl A-550 Data Sheet.
NeoResins, NeoCryl A-1095 Data Sheet.
NeoResins, NeoCryl A-6015 Data Sheet.
NeoResins, NeoCryl XK-96 Data Sheet.
NeoResins, NeoCryl XK-99 Data Sheet.

* cited by examiner

RETROREFLECTIVE ARTICLE COMPRISING WATER-BORNE ACRYLIC TOPCOATS

RELATED APPLICATIONS

This application claims priority to U.S. patent application Ser. No. 60/429,781 filed Nov. 27, 2002, U.S. patent application Ser. No. 60/402,100 filed Aug. 8, 2002, and U.S. patent application Ser. No. 60/374,443 filed Apr. 18, 2002.

FIELD OF THE INVENTION

The invention relates to retroreflective articles such as retroreflective sheeting that comprises a core sheet comprising retroreflective elements and a topcoat wherein the topcoat comprises certain water-borne acrylic polymer(s).

BACKGROUND OF THE INVENTION

U.S. Pat. No. 4,844,976 (Huang) relates to retroreflective sheeting that has been improved by a coating comprising silica and a transparent polymer selected from aliphatic polyurethanes, polyvinyl chloride copolymers having a minor amount of a comonomer containing at least one carboxylic acid or hydroxyl moiety, and acrylic polymers. Exemplified acrylic polymers include compositions based on acrylic polymers commercially available under the trade designations ("Neocryl A-614"), ("Neocryl A-612"), ("Neocryl A-601") and ("Rhoplex E-1895").

WO 00/68714 teaches a coating for a retroreflective document that renders the surface of the document receptive to toners and inks printed thereon while not substantially interfering with the retroreflective properties of the underlying substrate. In one embodiment, the coating comprises an aqueous based dispersion or emulsion of a crosslinkable acrylic acid polymer.

EP 0 615 788 A1 (Watkins) relates to a method for forming clear coats on retroreflective articles utilizing an aqueous coating composition comprising water, water-borne dispersion of polyurethane, and cross-linker, and optionally acrylic emulsion; retroreflective articles formed according to the method; and a liquid coating composition for use in the method and in making the articles.

U.S. Pat. No. 5,508,105 (Orensteen) relates to polymeric sheeting materials directly thermally printed upon with a thermal printing system and a polymer-based colorant/binder. The polymeric sheeting materials comprise a core sheet and a thermally print receptive surface on the core sheet. The thermally print receptive surface may be formed from compositions comprising a polyurethane dispersion optionally combined with an acrylic emulsion. The thermally print receptive surface is smooth, transparent, durable, and weatherable.

SUMMARY OF THE INVENTION

The Applicants have found that certain water-borne acrylic polymer based coating compositions provide a low cost alternative to the use of water-borne urethane topcoats. In some preferred embodiments, a single coating of water-borne acrylic polymer based coating composition provides sufficient adhesion to a retroreflective core sheet in combination with high retroreflective brightness and the desired surface protection. Advantageously, the preferred topcoat compositions can be formed into a film without high amounts of co-solvents at drying temperatures of less than 300° F. such as drying temperatures of less than 250° F.

The present invention discloses a retroreflective article comprising a core sheet having a viewing surface wherein the core sheeting comprises retroreflective elements and a topcoat disposed on the viewing surface. The topcoat consists essentially of at least one dried and optionally cured water-borne acrylic polymer or at least about 50 wt-% solids of at least one water-borne acrylic polymer and up to about 50 wt-% solids of a modifying polymer. The modifying polymer may comprise one or more ethylene acrylic acid (EAA) copolymers, ethylene methacrylic acid (EMAA) copolymers, ionically crosslinked EAA or EMAA, acrylic-urethane copolymers, polyvinyl chloride-containing copolymers, polyurethanes, and mixtures thereof.

In one aspect, the topcoat or water-borne acrylic polymer has an elastic modulus when tested with nanoindentation ranging from 0.2 GPa to 2.0 GPa.

Alternatively or in combination with the first aspect the topcoat or water-borne acrylic polymer (i.e. dried and cured) has a hardness when tested with nanoindentation of at least 0.1 GPa.

Alternatively or in combination with the first and/or second aspect, the topcoat or water-borne acrylic polymer (i.e. dried and cured) has an energy per volume at break of greater than 30 ft*lbf/in$^3$ (2.48 MJ/m$^3$).

Alternatively or in combination with the other aspects described, the dried and uncured water-borne acrylic polymer may be characterized as having an energy per volume at break of greater than 15 ft*lbf/in$^3$ (1.24 MJ/m$^3$) such as greater than 20 ft*lbf/in$^3$ (1.66 MJ/m$^3$), greater than 25 ft*lbf/in$^3$ (2.07 MJ/m$^3$), greater than 30 ft*lbf/in$^3$ (2.48 MJ/m$^3$).

Alternatively or in combination with the first and/or second and/or third aspect the topcoat has certain Differential Scanning Calorimetry characteristics. In one embodiment, the dried and optionally cured topcoat at least two second heat midpoint glass transition temperatures according to ASTM E 1356-98 wherein the first glass transition temperature ranges from about 70° C. to about 95° C. and the second glass transition temperature ranges from about 0° C. to about 35° C. In another embodiment, the dried and optionally cured topcoat has at least three second heat midpoint glass transition temperatures according to ASTM E 1356-98 wherein the first glass transition temperature ranges from about 90° C. to about 95° C., the second glass transition ranges from about 120° C. to about 130° C., and the third glass transition is less than −5° C. (e.g. less than about −10° C. less than about −15° C.).

For each of these aspects and embodiments, the thickness of the topcoat typically ranges from about 0.5 mils to about 3 mils. Further, the 60° gloss is typically at least about 40. The dry adhesion is typically at least 90%; whereas the wet adhesion is typically at least 20% and more typically at least 80%. The topcoat is typically substantially free of filler.

The topcoat of the invention may be disposed upon a variety of core sheetings (e.g. embedded-lens, encapsulated lens). For each of these aspects and embodiments, the topcoat is disposed between the core sheet and the viewing surface of the sheeting. In one embodiment, the topcoat is disposed directly on the core sheet. In another embodiment, the topcoat is exposed on the viewing surface of the sheeting. In other embodiments, a primer is disposed adjacent the topcoat. A primer may be disposed on the core sheet and the topcoat disposed on the primer. Alternatively or in combination thereof, a primer may be disposed on the topcoat and the primer exposed on the viewing surface of the sheeting.

Alternatively or in combination thereof an adhesive layer may be disposed between the core sheet and the topcoat.

The sheeting may further comprise a graphic. The graphic may be disposed on the topcoat. The graphic may be exposed on the viewing surface of the sheeting or disposed between the topcoat and the viewing surface of the sheeting. The topcoats are typically digitable printable by at least one method selected from laser printing, ink-jet printing, and thermal mass transfer printing.

In other aspects, the invention discloses a method of making a retroreflective article comprising providing core sheet comprising retroreflective elements having a viewing surface and an opposing surface, applying an aqueous topcoat to said viewing surface; and drying and optionally curing the topcoat. The topcoat typically comprises a volatile organic content ("VOC") of less than about 250 grams/liter as determined by ASTM D2369-81.

DETAILED DESCRIPTION OF THE INVENTION

Figure 1:
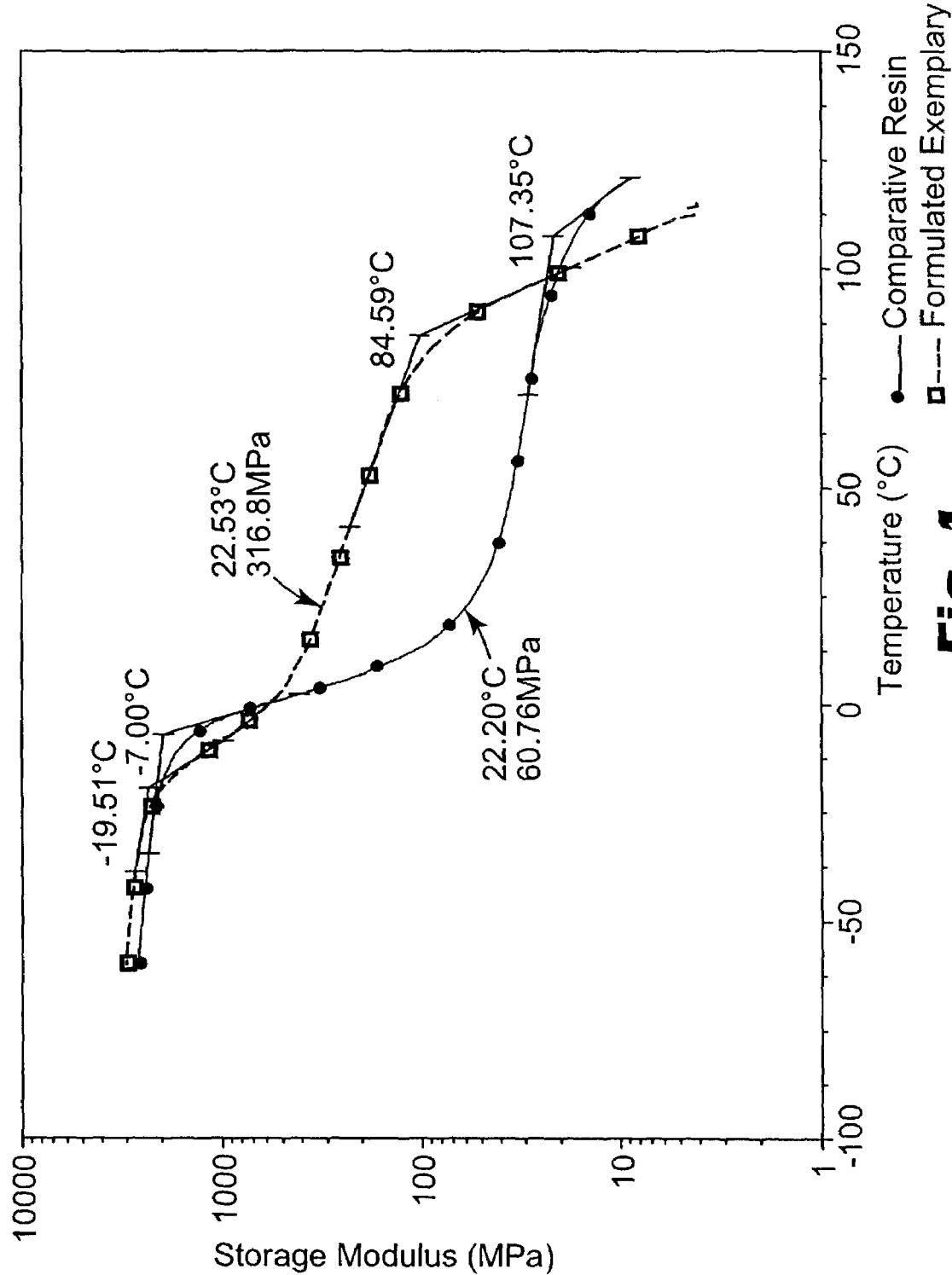
FIG. 1 is a graph of the storage modulus measured according to DMA of a comparative topcoat and an exemplary topcoat employed in the topcoat of the invention.

The retroreflective articles of the invention (e.g. sheeting) comprise a core sheet comprising retroreflective elements and a topcoat wherein the topcoat comprises at least one water-borne acrylic polymer. As used herein, the terminology "topcoat" refers to a layer disposed on the (e.g. outermost) viewing surface of a core sheet. "Water-borne" acrylic polymer refers to an acrylic polymer that is dispersed or emulsified in water. Topcoats derived from acrylic polymers that are soluble in water may also be suitable provided the polymer is crosslinked such that the topcoat is not soluble in water after application to the core sheet.

The water-borne acrylic polymers employed herein are generally substantially 100% acrylic (e.g. latex) emulsions, (e.g. modified) acrylic copolymer emulsions, or acrylic styrene copolymer emulsions. In some embodiments the acrylic polymers are self-crosslinking or optionally comprise a crosslinking agent. The acrylic polymers may be polymerized from a single acrylate monomer, but typically are a copolymer made from two or more acrylate monomers, optionally in combination with styrene monomers. In other embodiments, the acrylic polymers may have a core-shell structure. Core-shell polymers typically comprise a different copolymer with regard to either the base monomers or proportions thereof in the surrounding shell layer in comparison to the core. Core-shell polymers are generally described as two phase or multi phase polymers and may optionally contain a third phase incorporated into the same particle or as a separate particle. Other morphologies are also possible such as micro-phases, phase separated, bi-modal, multi-lobed, or inverted-core shell. The weight average molecular weight (Mw) of the water-borne acrylic polymer(s) is generally at least about 50,000 g/mole, more typically at least about 75,000 g/mole, more typically at least 100,000 g/mole and even more typically greater than about 200,000 g/mole. Further, the weight average molecular weight (Mw) of the water-borne acrylic polymer(s) may be as high as 1,000,000 g/mole. For embodiments that employ styrene acrylic copolymers, the styrene content of the copolymer is typically less than about 50 wt-%, more typically less than about 30 wt-%, and most typically less than about 20 wt-%. For good outdoor durability particularly for extended durations of time, copolymers containing substantial amounts of vinyl acetate are typically avoided.

The water-borne acrylic polymers have at least one attribute that is substantially different than the water-borne acrylic polymer based compositions that have been previously employed as topcoats for retroreflective articles such as those commercially available from Avecia under the trade designations "Neocryl A-614", "Neocryl A-612" and "Neocryl A-601"; commercially available from Rohm and Haas Company under the trade designation "Rhoplex E-1085"; and from Noveon Inc., Cleveland, Ohio under the trade designation ("Carboset GA 2136"), the "Carboset GA 2136" having been employed in combination with a crosslinker. In some instances, the water-borne acrylic polymers are derived from different monomers or the same monomer(s) at different proportions. Such compositional distinctions can be determined with various known polymer characterization techniques such as infrared spectroscopy (IR), nuclear magnetic resonance spectrometry (NMR), gel permeation chromatography (GPC), and pyrolysis gas chromatography/mass spectrometry (P-GC/MS). Alternatively, the water-borne acrylic polymers may be derived from the same monomers at about the same proportions wherein the morphology of the polymer is different (e.g. core-shell polymer). Such distinction can be characterized with the use of various microscopy techniques including scanning or transmission electron microscopy and atomic force microscopy (AFM) as well as with profilometry and/or surface analysis techniques. Typically, such compositional and/or morphological differences result in a difference of at least one physical property such as surface energy (e.g. contact angle), conductivity, pH, particle size (e.g. mean distribution), adhesion, hardness (e.g. Konig, Sward, nanoindentation), glass transition temperature (Tg) as determined by differential scanning calorimetry (DSC), and modulus as determined by nanoindentation or dynamic mechanical analysis (DMA), etc. Such characteristics and physical properties are inherent properties of the particular water-borne acrylic polymers and polymer blends exemplified herein.

The topcoat composition of the invention may comprise or consist essentially of a single water-borne acrylic polymer such as certain commercially available water borne acrylic polymers commercially available under the trade designations "NeoCryl XK-90", "NeoCryl XK-95", "NeoCryl XK-96", "NeoCryl XK-99", "NeoCryl A-6015", "Rhoplex GL-618" "Lucidene 603", "Lucidene 614", "Acronal Optive 310", "Neocar Acrylic 850", "Rhoplex AC-1035", "Rhoplex E-2310H" "Rhoplex E-2310H", and "Ucar Latex 419". Topcoat compositions comprising Rhoplex GL-618 preferably further comprise a silane adhesion promoter.

Retroreflective sheetings vary depending on the intended application and climatic conditions in which the sheeting will be exposed. Sometimes the sheeting is fairly stiff and have a relatively low elongation such as when converted by hand or when small pieces are cut from the sheeting and applied by hand to a retroreflective or non-retroreflective substrate. In other cases the sheeting is flexible and capable of being stretched such as in the case of license plates having alphanumeric characters formed by an embossing technique. The present inventors have found advantage in combining the base water-borne acrylic polymer with other harder or softer polymers to obtain such properties.

Accordingly, the topcoat may comprise a blend of acrylic polymers or a blend of at least one water-borne acrylic polymer with at least one modifying polymer. The topcoat compositions may comprise a totality of up to about 50 wt-% solids of modifying polymer(s). The modifying polymer is typically also a water-borne polymer and/or copolymer. Alternatively, the modifying polymer and/or copolymer may be commercially available in a powdered form that may be emulsified or dispersed in water with optional co-solvents. The modifying polymer may comprise one or more water-borne acrylic polymer(s). Alternatively or in combination thereof, acrylic-containing copolymers may also be employed such as EAA copolymers, EMAA copolymers, ionically crosslinked EAA or EMAA; urethane-acrylic copolymers (e.g. commercially available from Avecia under the trade designation Neorez R-9699) as well as non-acrylic modifying polymers, polyvinyl chloride-containing copolymers (e.g. commercially available from Union Carbide under the trade designation "Ucar WBV-110"), polyurethanes, and mixtures thereof.

In some instances a relatively "softer" modifying polymer is employed to improve adhesion, lower the effective film-forming temperature, and/or improve the flexibility. In other embodiments a relatively "harder" modifying polymer is employed to improve dirt resistance and/or abrasion resistance and/or the stiffness such that the sheeting can be more easily handled. Harder and softer modifying polymers have physical properties outside of the intermediate hardness range as will subsequently be characterized. In yet other instances, the modifying polymer may have the same hardness as the water-borne acrylic polymer described herein such as in the case of certain ethylene acrylic acid copolymers, and may be added to improve the water resistance and solvent resistance.

Exemplary hard modifying polymers include species of acrylic polymers such as water-borne acrylic polymers commercially available from Avecia under the trade designations Neocryl A-614, Neocryl A-612, Neocryl A-601, "Neocry XK-220", "Neocryl A-550", "Lucidene 370" and "Rhoplex E-1895". Other exemplary hard modifying polymers include hard polyurethane polymers such as commercially available from Avecia under the trade designation "Neorez R-960". For embodiments wherein a soft polyurethane modifying polymer is employed, such as commercially available from Avecia under the trade designation "Neorez R-972", the concentration of such is typically less than 20 wt-%, more typically less than 15 wt-% and most typically less than about 10 wt-% resin solids.

Exemplary acrylic polymer blends include a blend of Lucidene 603 with Lucidene 370 at a ratio of about 2:1; a blend of Neocryl XK-95 with up to about 20 wt-% Neocryl A-550; and blends of Neocryl XK-90 or Neocryl XK-95 with up to about 50 wt-% of Neocryl XK-220. Exemplary blends comprising at least one acrylic polymer with a least one modifying polymer include a blend at a ratio of about 1:1 of NeoCryl XK-220 with "Michem Prime 4983R", a 24.5–25.5 wt-% solids water-borne ethylene acrylic acid copolymers commercially available from Michelman, Cincinnati, Ohio; and a blend of Neocryl XK-95 with up to about 10 wt-% "Neorez R-9649", a 35 wt-% solids water-borne urethane commercially available from Avecia, Wilmington, Mass.

Although compositions comprising water-borne acrylic polymer available under the trade designation Lucidene were found to have suitable physical properties as it relates to hardness as will subsequently be described, such polymers were found to be less durable for outdoor use and thus are less preferred.

Each of the commercially available water-borne acrylic polymers described herein are available from the indicated supplier suspended or emulsified in water, typically having a solids content of about 40 to 50 wt-%. Further information concerning the generic chemical description as well as other physical properties, such as Tg, as reported by the supplier is found in forthcoming Table I.

The water-borne acrylic polymers and blends described herein that are suitable for use as a topcoat on retroreflective sheeting share a common characteristic of having an intermediate hardness, unlike the water-borne acrylic polymers previously employed as topcoats for retroreflective sheeting. The hardness of the dried film can be evaluated in several ways. Typically the Konig Hardness of a 3 mil coating cast on glass after 72 hours is less than 60 and typically less than 50. The Sward Hardness after 7 days is typically less than about 30. The Tg, as reported by the supplier, is typically less than about 70° C. to insure that the coating can be formed into a flexible film without high amounts of co-solvent at relatively low temperatures. At drying temperatures in excess of about 300° F., some paper liners that are often removably attached to the non-viewing surface of the core sheet tend to blister. For useful sheetings that handle easily without breaking, chipping, or tearing, the Tg of the water-borne acrylic polymer as reported by the supplier or blend is typically less than about 60° C. and more typically less than about 50° C. For drying temperatures of less than 250° F., the Tg as reported by the supplier of water-borne acrylic polymer or blend is typically less than 30° C. and more preferable less than 20° C. Further the Tg is typically at least −10° C. The Tg for a single polymer, polymer blend, or core-shell polymer can be determined according to DSC.

Water-borne acrylic polymers that are too hard are difficult to form into films without adding substantial amounts of co-solvent. Further, polymers that are too hard yield products that are brittle and/or have low impact strength, making them difficult to handle or unsuitable for many end uses. In contrast, water-borne acrylic polymers that are too soft tend to block (i.e. stick to each other) in roll-form or when stacks of sheets. Too soft of polymers are also susceptible to surface defects such as the non-viewing major surface of the sheeting (e.g.iner) forming an impression on the viewing surface. Further, the surface may be somewhat tacky such that dirt particles adhere to the surface.

The Tg for a water-borne acrylic polymer, as reported by the supplier (i.e. as reported in Table I) can vary as the test method for measuring the Tg may be different from one supplier to another. In some instances, a calculated Tg based on the Fox equation may be reported. Accordingly, the Tg of various water-borne acrylic polymers and blends that were found to be suitable were analyzed via DSC using the same method, following the guidelines described in ASTME1356-98. Specifically, a TA Instruments Q1000 Differential Scanning Calorimeter was used in Modulated (R) mode, with a scanning rate of 5° C./min, and in standard mode at 10° C./min. In both cases, the half-height or mid-point of the step transition was reported from the reversing heat flow signal. In order to test the Tg as well as other physical properties as will subsequently be described, the water-borne acrylic polymers and blends were first made into free films in the manner further described in the "Test Methods". Various formulations of water-borne acrylic polymers based topcoats were prepared as depicted in Tables A and B. Further information concerning the generic chemical description, supplier, and location of the supplier of the other ingredients employed in the formulations set forth in Table A and B is previously or subsequently described (e.g. Table I).

TABLE A

| Formulation No. | Neocryl XK-90 | Neocryl XK-95 | Carboset GA-2136 | Acrysol RM-6 | Acrysol RM-8* | CX100 & DI Water 1:1 |
|---|---|---|---|---|---|---|
| 1 | 300 | | | 3 | | |
| 2 | 300 | | | 4.69 | | 5.4 |
| 3 | | 300 | | 1.41 | | |
| 4W | | 300 | | | 4.2 | 4.92 |
| 4R | | 300 | | 2.72 | | 4.92 |
| 7 | | | 300 | | 1.85 | |
| 8 | | | 300 | | 2.87 | 5.76 |

*33.3% solution in deionized water

TABLE B

Trade Designation of Ingredient (part by weight)

| No. | Neocryl XK-90 | Neocryl XK-95 | Neocryl A-612 | Neocryl XK-220 | Optive 310 | Neocryl A-1095 | Acrysol RM-6 | Dowanol EB | CX100 & DI Water 1:1 |
|---|---|---|---|---|---|---|---|---|---|
| 11 | | 180 | | 120 | | | 2.19 | | |
| 12 | | 180 | | 120 | | | 4 | | 5.1 |
| 17 | | | | | 300 | | 4.89 | 15 | |
| 18 | | | | | 300 | | 3.83 | 15 | 5.4 |
| 21 | 270 | | | | | 30 | 2.33 | | |
| 22 | 270 | | | | | 30 | 3.28 | | 5.4 |
| 23 | | | 300 | | | | | | |
| 24 | | | 300 | | | | | | 3.84 |

Each of the formulations of Tables A and B that contained CX100 crosslinker also contained 0.15 parts Surfynol 104PA, 3 parts isopropyl alcohol, 1.5 parts Tinuvin 292, 1.5 parts Tinuvin 1130, 0.03 parts BYK 333. Most of the compositions tested employed at least a small mount of thickener to aid in the formation of a free film.

The first heat, second heat and cooling cycle transitions of the films thus formed were determined at a heat flow rate of 10° C./minute. All the water-borne acrylic polymers as well as the blends having a suitable intermediate hardness shared a common characteristic of having at least two and typically three distinct second heat transitions. Regardless of whether two or three transitions were evident, each suitable water-borne acrylic polymer and blends had a second heat midpoint Tg in the range of about 70° C. to about 95° C. and typically in the range of about 90° C. to about 95° C. Each of the suitable water-borne acrylic polymers and blends having only two transitions also had a second heat midpoint Tg in the range of about 0° C. to about 35° C. Further, each of the suitable water-borne acrylic polymers having three transitions had a second heat second midpoint Tg above 100° C. (e.g. about 115° C. to about 135° C.) in combination with a second heat third midpoint Tg of less than 0° C. Typically, the second midpoint Tg is about 120° C. to about 130° C. in combination with the third midpoint Tg being less than −5° C., more typically less than about −10° C., and even more typically less than about −15° C. Neocryl A-612 was found to have three second heat midpoint Tgs of 51° C., 91° C. and 120° C. according to this test method. The Tg profile of the suitable water-borne acrylic polymers, and blends was substantially the same for the uncrosslinked compositions as for the same crosslinked compositions comprising the same water-borne acrylic polymer.

Others tests conducted in order to characterize the suitable water-borne acrylic polymers and blends were nanoindentation, tensile, and DMA, the particular methodology described in the subsequent "Test Methods". The test results are in Table C as follows:

TABLE C

| Formulation (Trade Designation of Acrylic Polymer) | Elastic Modulus (Nanomech.) GPa | Elastic Modulus (GPa) DMA 1 Hz | Elastic Modulus (GPa) DMA 45 Hz | Hardness (Nanomech.) GPa |
|---|---|---|---|---|
| 8 (Carboset GA2136) | 0.194 ± 0.005 | 0.029 | 0.080 | 0.012 ± 0.008 |
| 12 (Blend of Neocryl XK-95 with Neocryl XK-220) | 1.276 ± 0.02<br>*1.456 ± 0.129 | 0.831 | 1.070 | 0.058 ± 0.001<br>*0.061 ± 0.01 |
| 22 (Neocryl XK-90) | 0.587 ± 0.013<br>*0.688 ± 0.31 | 0.239 | 0.630 | 0.011 ± 0.001<br>*0.015 ± 0.008 |
| 24 (Neocryl A-612) | 2.331 ± 0.096<br>2.341 ± 0.209** | | | 0.114 ± 0.011<br>0.118 ± 0.021** |
| 4R (Neocryl XK-95) | 0.513 ± 0.026 | 0.239 | 0.391 | 0.022 ± 0.001 |
| 4W (Neocryl XK-95) | 0.515 ± 0.019 | | | 0.024 ± 0.001 |

*cross-section technique,
**repeat

The top down elastic modulus via nanoindentation of the water-borne acrylic polymer based topcoats described herein is less than 2.3 GPa (e.g. 2.2, 2.1, 2.0, 1.9, 1.8). Further, the top down elastic modulus of the water-borne acrylic polymer based topcoats is greater than that of crosslinked Carboset GA2136, (e.g. 0.20 GPa, 0.3 GPa). Crosslinked Carboset GA2136 was found to be too soft to be employed as a topcoat, particularly on the exposed outermost viewing surface. The dried and cured coating was found to have substantial surface impression defects. Although top down hardness via nanoindentation was not suitable for defining a lower limit, Table C shows that the hardness via nanoindentation of the suitable water-borne acrylic polymers and blends is less than 0.114 GPa (e.g. 0.1), as Neocryl A-612 was found to be too brittle. Some of the samples were also tested using a cross section of the film to ensure comparable results may be obtained.

In yet another evaluation, a water-borne acrylic polymer, namely crosslinked Neocryl XK-95 was compared to crosslinked Carboset GA2136 via dynamic mechanical analysis (DMA). The results are shown in FIG. 1. Crosslinked Neocryl XK-95 exhibits a higher storage modulus at a temperature range from about 0° C. to about 100° C. Specifically, the storage modulus is about 60 MPa for crosslinked Carboset GA2136 at 25° C., whereas the crosslinked Neocryl XK-95 exhibits a storage modulus of about 400 MPa. Accordingly, the water-borne acrylic polymers and blends described herein typically have a storage modulus greater than 100 MPa at 25° C. and more typically greater than 200 MPa at 25° C. A similar relative difference is evident at temperatures of 50° C. and 75° C. as well.

Also reported in Table C is the elastic modulus determined with DMA of the samples that were tested. Although different values were obtained depending on the technique, the same relative trend is evident, namely that Carboset GA 2136 exhibited an appreciably lower elastic modulus that the water-borne acrylic polymers and blends of the invention. Further, its is important to note that Neocryl A-612 was too brittle to test via DMA.

Table D as follows reports the tensile of various water-borne acrylic polymers and blends of the invention in comparison to comparative water-borne acrylic polymers, namely crosslinked Carboset GA2136, Neocryl A-612, and Formulation 11. Table D shows that the various uncrosslinked water-borne acrylic polymers and blends of the invention as shown in columns 1 and 2 have an energy per volume at break of greater than 15 ft*lbf/in$^3$ (1.24 MJ/m$^3$). Typically, the energy per volume at break of the uncrosslinked water-borne acrylic polymers and blends is greater than 20 ft*lbf/in$^3$ (1.66 MJ/m$^3$), more typically greater than 25 ft*lbf/in$^3$ (2.07 MJ/m$^3$), and most typically greater than 30 ft*lbf/in$^3$ (2.48 MJ/m$^3$). After crosslinking, as shown in columns 3 and 4 of Table D, the energy per volume at break is greater than 30 ft*lbf/in$^3$ (2.48 MJ/m3), typically greater than 35 ft*lbf/in$^3$ (2.90 MJ/m$^3$), more typically greater than 40 ft*lbf/in$^3$ (3.31 MJ/m$^3$), even more typically greater than 45 ft*lbf/in$^3$ (3.73 MJ/m$^3$), and most typically greater than 50 ft*lbf/in$^3$ (4.14 MJ/m$^3$). The energy per volume at break is typically less than 200 ft*lbf/in$^3$ (16.6 MJ/m$^3$). It is important to note that Formulation 11 (containing a blend of Neocryl XK-95 with Neocryl XK-220) lacked sufficient cohesive strength unless crosslinked, per Formulation 12.

TABLE D

| | Tensile via ASTM D882-02 | | |
|---|---|---|---|
| Formulation (Trade Designation of Acrylic Polymer) | Energy per Volume at Break ft*lbf/in$^3$ | Formulation | Energy per Volume at Break ft*lbf/in$^3$ |
| 7 (Carboset GA2136) | 14.7 (1.22 MJ/m$^3$) | 8 | 27.6 (2.24 MJ/m$^3$) |
| 21 (Blend of Neocryl XK-90 with Neocryl A-1095) | 53.8 (4.45 MJ/m$^3$) | 22 | 64.4 (5.33 MJ/m$^3$) |
| 1 (Neocryl XK-90) | 69.7 (5.77 MJ/m$^3$) | 2 | 68.1 (5.64 MJ/m$^3$) |
| 3 (Neocryl XK-95) | 36.8 (3.05 MJ/m$^3$) | 4R | 59.1 (4.89 MJ/m$^3$) |
| 17 (Acronal Optive 310) | 89.5 (7.41 MJ/m$^3$) | 18 | 88.3 (7.31 MJ/m$^3$) |
| 11 (Blend of Neocryl XK-95 with Neocryl XK-220) | 15.1 (1.25 MJ/m$^3$) | 12 | 56.2 (4.65 MJ/m$^3$) |
| 23 (Neocryl A-612) | 10.8 (0.89 MJ/m$^3$) | 24 | 19.2 (1.24 MJ/m$^3$) |

In addition to the intermediate hardness physical property as just described, the topcoats of the invention often exhibit other properties as well. In one aspect, the water-borne acrylic based polymer topcoats are sufficiently transparent and exhibit sufficient gloss such that the presence thereof does not detract from the intended retroreflective properties. Accordingly, the composition is substantially free of ingredients that contribute substantial opacity or coating defects such as seeds, gels, non-wets, crazing, low gloss, discoloring such as yellowing, etc. Since many types of filler result in diminished gloss and/or retroreflected brightness, the topcoat compositions are typically substantially free of filler. The compositions described herein are sufficiently transparent such that when employed as a topcoat at a dried thickness ranging from about 0.5 mils to as much 7 mils the article exhibits a retroreflected brightness of at least 50 candelas per lumen, particularly for white embedded-lens microsphere-based sheeting such as commercially available from 3M Company ("3M") under the trade designation "Scotchlite Reflective License Plate Sheeting No. 3750", when measured at 0.2° observation angle and −4° entrance angle and the retroluminometer described in U.S. Defensive Publication T987,003. The dried and optionally cured coatings are sufficiently transparent such that the retroreflected brightness of the article ranges from about 60 to about 100 candelas per lumen, and more typically at least about 70 candelas per lumen. Further, the 60° gloss of the article is typically at least 30 according to ASTM D523-89 for 60° gloss. The 60° gloss of the article is typically at least about 50, more typically at least about 60, and most typically is at least about 70.

In some embodiments, the topcoat is disposed directly on the core sheet. Accordingly, the retroreflective article is free of additional layers disposed between the core sheet and the topcoat. In such embodiments, the topcoat alone provides sufficient adhesion to the viewing surface of the core sheet (e.g. polyvinyl butyral and crosslinked polyvinyl butyral) in combination with other surface protection properties, as desired. The core sheet is typically white or alternatively colored. Further the core sheet may further comprise a graphic. Particularly in the case of core sheets that comprise a graphic, the viewing surface layer of the core sheet surrounding the graphic may include a primer layer. In such instances, the topcoat is applied to the ink graphic and/or primer layer. An additional advantage of the topcoats described herein is that such topcoats are receptive to a variety of ink formulations including acrylic-based inks and vinyl-based inks.

The topcoat is typically applied such that the thickness after drying and optionally curing is at least about 0.5 mils. In applications requiring durability of greater than about 5 years, the topcoat is typically at least about 25 microns (1 mil), more typically at least 37.5 microns (1.5 mils) thick, and is some constructions a thickness of 50 microns (2 mils). Typically, the topcoat is the thickest layer in the optical path between the core sheet and the viewing surface of the retroreflective sheeting.

The sufficiency of adhesion can be determined with the "Dry Adhesion" test and in particular with the "Wet Adhesion" test, described in further detail in the examples. The retroreflective articles described herein pass the "Dry Adhesion" test, exhibiting 90% to-100% adhesion. The retroreflective articles typically pass the "Wet Adhesion" test as well, exhibiting at least 20% adhesion for end uses that do not require extended outdoor durability. The wet adhesion of the retroreflective articles of the invention is typically at least about 50%, even more typically at least about 70% and most typically about 90–100%. It is surmised that the water-borne acrylic polymer or polymer blend (i.e. unformulated) contributes the wet adhesion. Accordingly, the water-borne acrylic polymers may exhibit sufficient wet adhesion properties.

Emulsion polymers typically contain surfactants as part of the polymerization process. These surfactants remain in the polymer after the coating, drying and curing process. Surfactants are hydrophilic and readily attract moisture that is then absorbed and transmitted by the topcoat, often resulting in a loss of physical properties such as loss of transparency (commonly called blushing), loss of strength, and/or loss of adhesion. In many other intended uses for such emulsion polymers, the loss of such properties is not a problem. However, many types of retroreflective sheeting are required to maintain its properties for as many as 12 years or longer. Further, the same types of retroreflective sheeting may be used globally and thus exposed to various climatic stresses. The present inventors have found that certain water-borne acrylic polymers as described herein are more resistant to loss of adhesion than the majority of commercially available water-borne acrylic polymer emulsions. Although, many manufacturers of acrylic polymer emulsions describe their polymers as having "wet adhesion" properties or to be "wet adhesion enhanced", few actually meet the test criteria of having at least 20% adhesion after the 24 hour 100/100 condensing humidity test as further described in the "Wet Adhesion" test subsequently described.

Without intending to be bound by theory, it is surmised that the acrylic polymer emulsions that exhibit sufficient adhesion may have reduced levels of surfactant, be surfactant free by reacting the surfactant into the polymer backbone, or may further comprise what are commonly called "Wet Adhesion Monomers" (WAM). Exemplary WAMs are commercially available from Rhodia, France under the trade designation "Sipomer WAM II", described as a methacrylamido ethyleneurea monomer and "Sipomer WAM", described as an allyl ureido monomer; and also commercially available by Röhm GmbH, Darmstadt, Germany under the trade designation "Rohamere 6844 0", described as N-(2-methacryloyloxy-ethyl)ethylene urea. It is believed that other factors also influence the moisture sensitivity of the topcoat such as emulsion particle size, wetting agents, type of surfactant, use of a co-solvent, etc. The desired performance of the topcoat is obtained by selection of certain water-borne acrylic polymers in combination with employing such composition at an appropriate thickness.

Water-borne acrylic polymers comprising the proper balance of properties except for adhesion may be improved by the addition of silane adhesion promoters such as an organofunctional silane adhesion promoter. Silane adhesion promoters have the general formula:

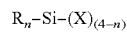

$R_n-Si-(X)_{(4-n)}$

Wherein R is an organofunctional group such as vinyl, epoxy, acrylate or methacrylate, amine, mercapto, or styryl groups; and X is a hydrolyzable such as alkoxy, acyloxy, amine, or chlorine. The silane adhesion promotor is typically present in an amount ranging from about 0.25 to about 10 parts by weight of the aqueous formulation and more typically in an amount ranging from about 1 to about 3% solids.

Preferred topcoats of the invention are "digital printable" meaning printable by a digital printing including, not limited thereto, laser, ink-jet, thermal mass transfer, thermal dye transfer, electrostatic, ion deposition, electron beam imaging, solid ink-jet and dot-matrix printings. More preferably the topcoats of the invention are laser, thermal mass transfer, or ink-jet printable. In the case of topcoats intended for license plate sheeting the topcoats are typically digital printable by means of thermal mass transfer or laser printing or printable by means of hot stamping. The dried and optionally cured topcoat may be printed prior to being disposed on the retroreflective core. In such embodiments, the topcoat is preferably reverse imaged and then disposed such that the image is between the topcoat and the retroreflective core. Alternatively, the topcoat may be imaged after it has been coated onto the retroreflective core. In either embodiment, primer layers may optionally be employed to improve the ink receptivity.

Another optional yet typical feature of retroreflective sheeting topcoats is a balance of solvent resistance. Solvent-based inks may be applied to the topcoat described herein to form a graphic. Further, however, tar or oils that may accumulate on the sheeting may be removed with a solvent soaked cloth. Uncrosslinked acrylic polymers typically do not have sufficient solvent resistance.

Accordingly, the coating composition may optionally contain one or more crosslinkers such as isocyanate crosslinkers, melamine crosslinker, aziridine crosslinkers and blends thereof. An illustrative isocyanate crosslinker is available from Bayer under the trade designation "Bayhydur 3100". When a melamine is employed, the coating compositions typically contains up to about 10, and typically about 5 weight percent melamine. An illustrative melamine crosslinker is commercially available from Monsanto under the trade designation "Resimene AQ7550". When an aziridine crosslinker is employed, the concentration of such typically ranges from about 0.2 and about 4 weight percent based on polymer solids. An illustrative polyfunctional aziridine crosslinker is commercially available from Avecia under the trade designation "Crosslinker CX-100" or from RucoPolymer Corp., Hicksville, N.Y. under the trade designation "Xama 7". The present inventors have found that low levels of crosslinkers may be employed. For such embodiments, the concentration of crosslinker is about 2% based on the percent polymer solids. Alternatively, the concentration of crosslinker may be less than 1.5%, less than about 1.0%, less than about 0.5%, or less than about 0.2% (e.g. less than 0.1%).

Suitable solvent resistance can be determined by measuring the gloss before and after submerging the sheeting in toluene for 15 seconds followed by immediately lightly wiping off the excess toluene, allowing the sheeting to dry for 1 hour, and then remeasuring the gloss. Coatings of sufficient solvent resistance will retain at least 60% of their initial gloss, more typically at least 80%, and most typically at least 90%.

Alternatively or in addition to crosslinking the topcoat, a primer may be applied to the topcoat on the outermost viewing surface. An example of a transparent primer that provides suitable solvent and weathering resistance, sufficiently adheres to the topcoats described herein, and is receptive to inks, transparent and resistant to weathering effects is a polyurethane resin commercially available from Avecia under the trade designation "Neorez R-960" crosslinked with about 5 to 20 wt-% based on resin solids of "CX-100".

Retroreflective sheetings of the invention may be used globally in all types of climates and accordingly have sufficient resistance to UV degradation. Resistance to degradation from UV is provided in part by the use acrylic moieties of the water-borne acrylic polymers described herein. However, the commercially available water-borne acrylic polymers typically exhibit insufficient extended outdoor durability in the absence of the addition of one or more ultraviolet ("UV") absorbers and/or UV stabilizer. Increased resistance to ultraviolet light can be obtained by adding UV absorbers and/or by addition of light stabilizers such as hindered amine. A UV absorber is typically added to the topcoat composition, such that the topcoat layer absorbs a minimum of 90% of the available outdoor UV radiation, and more typically at least 99%. The UV absorber concentration is typically adjusted to the thickness of the coating according to Beers Law. An illustrative UV stabilizer is commercially available from Ciba Specialties under the rade designation "Tinuvin 292" (a hindered amine light stabilizer containing bis (1,2,2,6,6-pentamethyl-4-piperdinyl)sebacate and methyl-1,2,2,6,6-pentamethyl-4-piperdinyl sebacate). An illustrative UV absorber is commercially available from Ciba Specialties under the trade designation "Tinuvin 1130" (containing the reaction product of beta-(3-(2H-benzotriazol-2-YL-4-hydroxy-5-tert-butylphenyl)proprionic acid, methyl ester and ethylene glycol 300).

The retroreflective sheeting articles of the present invention are often sufficiently durable such that the articles are able to withstand at least one year and more typically at least three years of weathering. This can be determined with ASTM D4956-99 Standard Specification of Retroreflective Sheeting for Traffic Control that describes the application-dependent minimum performance requirements, both initially and following accelerated outdoor weathering, of several types of retroreflective sheeting. Initially, the reflective substrate meets or exceeds the minimum coefficient of retroreflection. For Type I white sheetings ("engineering grade"), the minimum coefficient of retroreflection is 70 cd/fc/ft$^2$ at an observation angle of 0.2° and an entrance angle of −4°, whereas for Type III white sheetings ("high intensity") the minimum coefficient of retroreflection is 250 cd/fc/ft$^2$ at an observation angle of 0.2° and an entrance angle of −4°. In addition, minimum specifications for shrinkage, flexibility adhesion, impact resistance and gloss are typically met. After accelerated outdoor weathering for 12, 24, or 36 months, depending on the sheeting type and application, the retroreflective sheeting typically shows no appreciable cracking, scaling, pitting, blistering, edge lifting or curling, or more than 0.8 millimeters shrinkage or expansion following the specified testing period. Further, the weathered retroreflective articles typically exhibit at least the minimum coefficient of retroreflection and colorfastness. For example, Type I "engineering grade" retroreflective sheeting intended for permanent signing applications retains at least 50% of the initial minimum coefficient of retroreflection after 24 months of outdoor weathering and Type III high intensity type retroreflective sheeting intended for permanent signing applications retains at least 80% of the initial minimum coefficient of retroreflection following 36 months of outdoor weathering in order to meet the specification. The coefficient of retroreflection values, both initially and following outdoor weathering, are typically about 50% lower in view on imaged retroreflective substrates.

Depending on the coating technique employed for applying the coating to the core sheet, the commercially available water-borne acrylic polymers typically lack the proper viscosity and or rheological properties, particularly for high speed coating applications. In such embodiments, the coating compositions typically comprise at least one thickener. Illustrative thickeners include thickeners commercially available from Rohm and Haas under the trade designations "Acrysol RM-8W", "Acrysol RM-5" and "Acrysol RM-6" as well as "Rheovis CR2", commercially available from Ciba Specialties. Additives such as rheology modifier(s), flow agent(s), leveling agent(s) anti-foamant(s), anti-skinning agent(s), surfactants, mar resistant additives, and various preservatives such as biocides may also typically included in the aqueous topcoat compositions at small concentrations. Also diluents such as water or certain organic solvents that are compatible with or miscible with water may be added to reduce solids.

The aqueous topcoat compositions may contain low amounts of organic solvents, e.g., typically about 10 wt-% based on the aqueous formulation, as co-solvents facilitate mixing and handling as well as aid in film formation of relatively high Tg components. The presence of such co-solvents improves coalescence, surface wetting and penetration into the core sheet surface. The aqueous topcoat compositions typically have volatile organics content ("VOC") of less than about 250, preferably less than 150, grams/liter as determined based on ASTM D2369-81, at application.

The aqueous topcoat compositions may further comprise one or more colorants such as organic or inorganic pigments or dyes, including white, black, and colored materials. If desired, the color agents may be fluorescent. Pigments are typically preferred over dyes for suitable outdoor performance. In embodiments wherein a colorant is included, the topcoat also provides a color layer.

Typically, pigments are chosen such that the color is similar when viewed under ordinary diffuse light conditions (e.g. daylight) in comparison to night time, when illuminated by vehicle headlights. In order to obtain such properties, the pigment typically has a relatively narrow absorption band to yield a saturated color. Further, the pigment particles typically have an average refractive index of about 1.5 and an average diameter of less than 1 micron in order to minimize light scattering. It is preferred that the particles have an index of refraction that is close to that of the surrounding water-borne acrylic polymer.

When employed, pigments are dispersed in an aqueous system by milling the pigment particles in combination with a water dispersible or water soluble polymeric binder or alternatively, milling the pigment particles in combination with a suitable surfactant with water, water dispersible polymer, water soluble polymer or in combination.

Illustrative examples of suitable organic pigments include phthalocyanines, anthraquinones, perylenes, carbazoles, monoazo- and diazobenzimidazolone, isoindolinones, monoazonaphthol, diarylidepyrazolone, rhodamine, indigoid, quinacridone, disazopyranthrone, dinitraniline, pyrazolone, dianisidine, pyranthrone, tetrachloroisoindolinone, dioxazine, monoazoacrylide, and anthrapyrimidine.

Commercial examples of useful organic pigments include those known under the trade designations PB 1, PB 15, PB 15:1, PB 15:2, PB 15:3, PB 15:4, PB 15:6, PB 16, PB 24, and PB 60 (blue pigments); PB 5, PB 23, and PB 25 (brown pigments); PY 3, PY 14, PY 16, PY 17, PY 24, PY 65, PY 73, PY 74, PY 83, PY 95, PY 97, PY 108, PY 109, PY 110, PY 113, PY 128, PY 129, PY 138, PY 139, PY 150, PY 154, PY 156, and PY 175 (yellow pigments); PG 1, PG 7, PG 10, and PG 36 (green pigments); PO 5, PO 15, PO 16, PO 31, PO 34, PO 36, PO 43, PO 48, PO 51, PO 60, and PO 61 (orange pigments); PR 4, PR 5, PR 7, PR 9, PR 22, PR 23, PR 48, PR48:2, PR 49, PR 112, PR 122, PR 123, PR149, PR 166, PR 168, PR 170, PR 177, PR 179, PR 190, PR 202, PR 206, PR 207, and PR 224 (red); PV 19, PV 23, PV 37, PV 32, and PV 42 (violet pigments); and PBLACK (black), several of which are available from Heucotech LTD, Fairless Hills, Pa. as aqueous dispersions under the trade designation "Aquis IT".

Other useful commercially available aqueous pigment dispersions include those known under the trade designations "Aqualor", available from Penn Color Inc., Doylestown, Pa.; "Micorlith-WA", available from Ciba Geigy Corporation, Pigments Division, Oak Brook, Ill.; "Sunsperse Flexiverse" and "Aquatone", available from Sun Chemical Corporation, Dispersions Division, Amelia, Ohio; and "Heucosperse III", available from Heucotech LTD, Fairless Hills, Pa.).

The retroreflective sheeting can be constructed in a variety of methods. One method of making the retroreflective sheeting article of the invention generally comprises providing a core sheet comprising retroreflective elements, applying the previously described water-borne acrylic topcoat to the core sheet and, drying and optionally curing the coating composition. In some embodiments, the topcoat is present on the outermost viewing surface of the article and is thus exposed. In other embodiments a primer layer may be applied to the topcoat layer in order to improve its surface properties such as solvent resistance. In another method, the topcoat may be formed on a carrier, such as a release liner, by coating the composition to the carrier, drying and optionally curing the coating composition. The topcoat in the form of a film layer may then be bonded to the core sheet via heat lamination or by means of applying an adhesive to the retroreflective core and/or the topcoat film layer. In another method, the topcoat may first be formed as a film layer on a carrier as just described and then the core sheet may be formed upon the dried and optionally cured topcoat such as by applying a liquid binder and glass microspheres. The retroreflective elements (e.g. glass beads, cube corner elements) are typically arranged such that the elements are provided at least in a monolayer.

Before applying, the coating composition to either the retroreflective core or the carrier web, the coating composition is sufficiently mixed, particularly for embodiments having modifying agents such as thickener. Preferably mixing is done in such a manner as to avoid entrainment of air to ensure formation of a uniform, defect-free coating. Further, the core sheet is typically surface treated (e.g. corona treated) prior to applying the coating composition.

The coating composition can be applied to the core sheet or carrier using many known techniques, including for example dipping, spraying, flood coating, curtain coating, roll coating, bar coating, knife coating, slot fed knife coating (e.g. single and dual layer), wire-wound coating, gravure coating (e.g. direct or reverse). The amount of thickener or diluent is adjusted to yield optimum viscosity for the selected coating method.

The composition is dried and optionally cured to form the desired topcoat. Depending on the coating composition, sufficient drying and optional curing may be achieved at temperatures ranging from ambient temperature to about 360° F. Topcoat compositions of the invention are film-forming in the absence of high amounts of co-solvents at temperatures of less than about 300° F., and more typically at temperatures of about 220° F. to 250° F. or less. Preferred water-borne acrylic polymer based topcoats exhibit wide processing latitude, meaning that sufficient drying and optional curing can be obtained with a relatively wide range of temperature and oven retention times. This insures that minor processing variables will not result in defective topcoats.

A variety of retroreflective core sheets may be employed. Such core sheets may be retroreflective alone, prior to application of the topcoat described herein or may provide retroreflection only after being combined with such topcoat. The retroreflective core is typically a preformed sheeting. The two most common types of retroreflective sheeting are microsphere-based sheeting and cube corner-based sheeting.

Retroreflective sheetings are generally described as "enclosed-lens", "embedded-lens" and "encapsulated-lens". Enclosed-lens retroreflective sheeting comprises a monolayer of retroreflective elements having a top film or cover layer (i.e. topcoat described herein) protecting the front surfaces thereof, e.g. a monolayer of microspheres having a reflective layer in optical association with the rear surfaces thereof, sometimes spaced apart by a spacer layer, and a cover layer (i.e. topcoat described herein) protecting the front surfaces of the reflective elements (in which the microspheres may or may not be embedded). "Embedded-lens retroreflective sheeting" comprises a monolayer of microspheres having a space layer and a reflective layer in optical association with the rear surface thereof and a cover layer in which the front surfaces of the microspheres are embedded. An example of a cube-corner embedded-lens sheeting comprises a monolayer of cube-corners whose front and rear surfaces are embedded in polymeric matrices and a specular reflective layer coated or metallized on the surface of the cube-corners. "Encapsulated-lens retroreflective sheeting" comprises a monolayer of retroreflective elements, e.g. a monolayer of microspheres with reflective means in association with the rear surfaces and a cover layer (i.e. topcoat described herein) disposed to the front surface thereof or a layer of cube corner elements with a layer sealed to the rear surface thereof providing an air interface wherein the cube corner elements have a specular reflective metal layer thereon. The layer of cube corner elements also typically comprises a cover layer, i.e. the topcoat described herein.

Microsphere-based sheeting, sometimes referred to as "beaded sheeting," is well known in the art and includes a multitude of microspheres typically at least partially embedded in a binder layer, and associated specular or diffuse reflecting materials (such as metallic vapor or sputter coatings, metal flakes, or pigment particles). Illustrative examples of microsphere-based sheeting are disclosed in U.S. Pat. Nos. 4,025,159 (McGrath); 4,983,436 (Bailey); 5,064,272 (Bailey); 5,066,098 (Kult); 5,069,964 (Tolliver); and 5,262,225 (Wilson).

A preferred retroreflective core comprises glass microspheres that provides a low level of retroreflectivity, the retroreflectivity being substantially enhanced upon application of the topcoat that completes the optics. The glass microspheres are dispersed throughout the binder layer and are present substantially as a monolayer dispersed in the binder layer with an underlying specular reflective layer spaced from the microspheres by the transparent binder material. Suitable binder layer materials include polyvinyl butyral, aliphatic polyurethane and polyurethane extended polyester (e.g., described at column 15, lines 30-35 of U.S. Pat. No. 5,882,771). The specular reflective layer may be a vapor deposited aluminum layer.

Another core layers that can be employed to make sheeting are encapsulated beaded sheetings such as described in U.S. Pat. No. 4,025,159 (McGrath). In this embodiment, the core layer polymers should be chosen for their compatibility with the described topcoats of this invention. Thus polymers could be chosen from the generic families of acrylics, or vinyls, or urethanes, or other polymers that are initially thermoplastic and capable of undergoing softening under conditions of heat and pressure and can be sealed to preformed topfilms of the invention using typical the heat embossing techniques taught in U.S. Pat. No. 4,025,159 (McGrath). In this case, the topcoats are coated and dried on a releasable carrier web. After drying and optional curing, the topcoat is heat sealed to the beaded layer such as in the manner described by Example 2 of U.S. Pat. No. 4,025,159 (McGrath), and the releasable carrier on the topfilm is removed. Optionally, curing from heat, UV, e-beam, etc. can be further employed to improve properties attributed to crosslinking as previously described.

Cube corner sheeting, sometimes referred to as prismatic, microprismatic, triple mirror or total internal reflection sheetings, typically include a multitude of cube corner elements to retroreflect incident light. Cube corner retroreflectors typically include a sheet having a generally planar front surface and an array of cube corner elements protruding from the back surface. Cube corner reflecting elements include generally trihedral structures that have three approximately mutually perpendicular lateral faces meeting in a single corner—a cube corner. In use, the retroreflector is arranged with the front surface disposed generally toward the anticipated location of intended observers and the light source. Light incident on the front surface enters the sheet and passes through the body of the sheet to be reflected by each of the three faces of the elements, so as to exit the front surface in a direction substantially toward the light source. In the case of total internal reflection, the air interface must remain free of dirt, water and adhesive and therefore is enclosed by a sealing film. Alternatively, reflective coatings may be applied on the back side of the lateral faces. Polymers for cube corner sheeting include poly(carbonate), poly(methyl methacrylate), poly(ethylene terephthalate), aliphatic polyurethanes, as well as ethylene copolymers and ionomers thereof. Cube corner sheeting may be prepared by casting directly onto a film, such as described in U.S. Pat. No. 5,691,846 (Benson, Jr.) incorporated herein by reference. Polymers for radiation-cured cube corners include cross-linked acrylates such as multifunctional acrylates or epoxies and acrylated urethanes blended with mono-and multifunctional monomers. Further, cube corners such as those previously described may be cast on to plasticized polyvinyl chloride film for more flexible cast cube corner sheeting. These polymers are often employed for one or more reasons including thermal stability, environmental stability, clarity, excellent release from the tooling or mold, and capability of receiving a reflective coating.

Typically cube corner sheeting employs a topcoat layer that gives protection to the underlying cube corner layer and may add other functionality such as improved ink receptivity, dirt resistance, flexibility or rigidity, coloration, etc. Topcoats of the invention can be coated directly onto the cube corner sheeting or alternately preformed and heat laminated either during the manufacturing of the cube corner layer or in a subsequent operation. When using relatively thick, strong, thick polycarbonate layers for the cube corner sheeting, the topcoat has a minimal contribution to the physical properties of the sheeting, and polymer selection can be made based on the adhesion to the polycarbonate, dirt resistance, resistance to surface impression, etc.

In embodiments wherein the sheeting is likely to be exposed to moisture, the cube corner retroreflective elements are preferably encapsulated with a seal film or the cubes can be specular reflective coated and back filled to totally embed the cube layer in water resistant polymer. In instances wherein cube corner sheeting is employed as the retroreflective layer, a backing layer may be present for the purpose of opacifying the article or article, improving the scratch and gouge resistance thereof, and/or eliminating the blocking tendencies of the seal film. Illustrative examples of cube corner-based retroreflective sheeting are disclosed in U.S. Pat. No. 4,588,258 (Hoopman); U.S. Pat. No. 4,775, 219 (Appledorn et al.); U.S. Pat. No. 4,895,428 (Nelson); U.S. Pat. No. 5,138,488 (Szczech); U.S. Pat. No. 5,387,458 (Pavelka); U.S. Pat. No. 5,450,235 (Smith); U.S. Pat. No. 5,605,761 (Bums); 5,614,286 (Bacon Jr.) and U.S. Pat. No. 5,691,846 (Benson, Jr.).

The retroreflective sheeting having the water-borne acrylic based topcoat may be used for a variety of uses such as traffic signs, license plates, pavement marking (e.g. raised pavement markings), personal safety, vehicle decoration and commercial graphics such as retroreflective advertising displays, bus wraps, etc.

Objects and advantages of the invention are further illustrated by the following examples, but the particular materials and amounts thereof recited in the examples, as well as other conditions and details, should not be construed to unduly limit the invention. All percentages and ratios herein are by weight unless otherwise specified.

EXAMPLES

Test Methods
1. Thickness The thickness of the dried coating was measured according to ASTM D5947-01 using Test Method C except that a digital scale device was used as provided by Mitutoyo Code No. 543-162-1 Type 1DB112ME. The thickness was determined by measuring the thickness of the sheeting, the thickness of the sheeting with the dried topcoat, and subtracting off the sheeting thickness. The reported result was the average of 5–10 readings.
2. Dry Adhesion The dry adhesion was evaluated according to ASTM D3359-02 Method B except that the test sample was first applied to a 0.070 inch thick aluminum panel. The sample was then cross hatched with a razor blade according to the procedure and tested for adhesion using tape commercially available from 3M Company ("3M"), St. Paul, Minn. under the trade designation "Scotch Brand Tape No. 390". The tape was applied to the cross hatched sample using a plastic squeegee using very forceful stokes to very strongly adhere the tape to the specimen and then removed at a 90° angle. The adhesion was rated by estimating the amount of topcoat that remained on the sheeting (e.g. no coating removed is reported as 100% adhesion while half removed is reported as 50%). 90% Adhesion is considered to pass, with 100% being preferred. One sample was tested.

3. Wet Adhesion The wet adhesion was evaluated in the same manner as the dry adhesion except that the test panel was conditioned in a chamber maintained at 100° F. and 100% relative humidity for a period of 24 hours using conditions of condensing humidity as specified in ASTM D2247-02. The panel was removed from the conditioning device, towel dried immediately, crosshatched with a prepared using the same drying and curing conditions as the examples. Drying and curing is generally done at low temperatures of 100° F. to 150° F. for at least 2 minutes and up to 10 minutes. Curing is done at 300° F. for 2 minutes to assure complete curing and drying without any bubbles, blistering, non-wets, etc. Coating thickness is varied to get an approximate free film thickness of 0.001–0.0015 inches.

6. Hardness and Elastic Modulus via Nanoindentation Method The hardness and elastic modulus of the surface of the free films were tested using top down nanomechanical testing. Some of the samples were also tested on the retroreflective core using cross-sectional nanomechanical testing to verify that similar results are obtained. For cross-sectional testing one specimen was cut from each sample using a scissors. Each specimen was Au/Pd coated, inserted into an 11/4 inch phenolic ring, placed into the vacuum chamber, and mounted in Struers Caldo Fix Epoxy under vacuum. The specimens were allowed to cure for 2½ days. The specimens were polished according to the following procedure.

| Surface | Abrasive | Lubricant | Force (N/sample) | Platen Rotation | Speed (rpm) | Time (min) |
|---|---|---|---|---|---|---|
| Grinding Paper | 320 Grit | Water | 20 | Comp | 150 | Until planar |
| Grinding Paper | 600 Grit | Water | 20 | Comp | 150 | ~1:00 or until scratches from previous step are removed |
| MD Largo ® (Stuers, Inc.) | 9 µm | Blue Lubricant ® (Stuers, Inc.) | 30 | Comp | 150 | ~4:30 or until scratches from previous step are removed |
| MD Mol ® (Stuers, Inc.) | 3 µm | Blue Lubricant ® (Stuers, Inc.) | 20 | Comp | 150 | ~3:00 or until scratches from previous step are removed |
| Chemomet ® (Buehler, Ltd.) | Mastermet II ® (Buehler, Ltd.) | Water | 20 | Comp | 150 | ~2:40 or until scratches from previous step are removed | razor blade, tape applied and squeegeed, and tested for adhesion. Although 100% adhesion is preferred, 20% is considered to pass due to the severity of the test. When 100% of the topcoat is removed, the removal force is usually less than 1 lb/inch width. One sample was tested.

3. Gloss The gloss was measured according to ASTM D523-89 (Reapproved 1999) at a 60° geometry using a Pacific Scientific, Gardner/Neotec Instrument Div., Glossgard II 60° Glossmeter. The reported result was the average of about 3 readings.

4. Brightness The retroreflective brightness was measured at 0.20 observation angle and −4° entrance angle using the retroluminometer described in defensive publication T987,003 Values for white sheeting are typically 50–150 candelas per lux per square meter (abbreviated "CPL") for this embedded-lens microsphere-based retroreflective sheeting. When the topcoat further comprises a colorant, the expected brightness values are lower. The reported result was the average of about 3 readings.

5. Preparation of Films Prior to testing the water-borne acrylic polymers via nanoindentation, DMA and Tg, free films were prepared for testing by coating the desired formulation onto a glossy (50 using a 60° gloss test) releasable substrate without using any surface treatment on this substrate prior to coating and then drying the coating. The formulations containing crosslinker were also cured. Suitable releasable substrates include glass plates, metal panels, fluoropolymer films, and release liners such as polyethylene coated paper films. Films were The samples were mounted on 2-inch diameter epoxy cylinders, which served as fixtures in the Nano XP translation stage. For all experiments a diamond Berkovich probe was used. The nominal loading rate was set at 10 nm/s with spatial drift set point set at 0.05 nm/s maximum. A constant strain rate experiment at 0.05/s to a control depth of 1000 nm was used. The regions to be characterized were located as seen top-down as viewed through a video screen with 400×magnification. The test regions were selected locally with 400×video magnification of the XP to insure that tested regions were representative of the desired sample material, i.e. free of voids, inclusions, or debris. Furthermore, microscope optical axis-to-indenter axis alignment was checked and calibrated previous to testing by an iterative process where test indentations are made into a fused quartz standard, with error correction provided by software in the XP.

The sample surface was located via a surface find function where the probe approaches the surface with a spring stiffness in air, which changes significantly when the surface is encountered. Once the surface was encountered, load-displacement data was acquired as the probe indents the surface. This data was transformed to an Elastic Modulus and Hardness, based on the methodology described below. The experiment was repeated in different areas of the sample so that a statistical assessment can be made of the mechanical properties.

The Elastic Modulus determined directly from the load-displacement data is a composite Modulus, i.e. the Modulus of the diamond probe and the sample material. The composite Modulus for these load-displacement indentation experiments is determined from:

$$S=2/SQRT(Pi)*F*SQRT(A)$$

where

S—contact stiffness, determined via the MTS XP's patented Continuous-Stiffness-Method (CSM), by solving the differential equation relating a periodic forcing function $F(t,w)=m\ d^2x/dt^2+k\ x+b\ dx/dt$ to the coefficients of the rheological sample-indenter mechanical system, i.e. the in-phase and out-of-phase components of the displacement response to the forcing function, yield the in-phase spring constant k, (thus the stiffness—hence contact area), and out of phase damping coefficient, b. The default excitation frequency for these tests was 45 Hz.

A—area of contact [m^2], assuming that the indentation replicates the shape of the indenter during indentation, the indenter geometry is modeled via analytic geometry so that the projected area, A=h^2+higher order terms where h–displacement depth, and higher order terms are empirically measured.

F—Composite Modulus [GPa]

Then the sample material's Elastic Modulus (E) is obtained from $$1/F=(1-u^2)/K+(1-v^2)/E$$

Where u—Poisson Ratio of diamond indenter=0.07
K—Elastic Modulus of diamond indenter=1141 GPa
v—Poisson Ratio of samples (a Poisson's Ratio of 0.4 is assumed for these specimens, while 0.18 for the calibration standard is entered into the algorithm for determining Elastic Modulus.)

Hardness is defined as the minimum threshold contact stress that results in permanent deformation. Hardness, H is defined as $$H=P/A$$

Where, P—load necessary to induce plastic flow [mN]
A—contact area of indenter

Modulus data was averaged over a spatial window form 400 to 800 nm, as well as the number of indentation made for a given sample (i.e. 5).

7. Tensile—the energy per volume at break was determined by first coating the water-borne acrylic polymer, based formulation on a core sheet commercially available from 3M under the trade designation "Scotchlite Reflective License Plate Sheeting No. 3750" ("3750 Sheeting") at a dry thickness of 1.3 mils. The coatings were completely dried and optionally cured as described as described in Example 1 with oven set temperatures of 150° F./180° F./230° F./300° F. /300° F. The dried and cured samples were tested within 14–28 days after coating according to ASTM D882-02. The width of each sample was 1 inch, the distance between the jaws was 4 inches, and the rate was 2 inches/minute.

8. Dynamic Mechanical Analysis (DMA) Samples were cut and measured using a TA Instruments 2980 series Dynamic Mechanical Analyzer (DMA) in film tension mode. The storage modulus (E'), loss modulus (E") and tanδ were measured over a temperature range from −60° C. to +125° C. The measurements were made using oscillatory peak-to-peak strain amplitude of 15 microns and a strain rate (frequency) of 1Hz.

Table I, as follows, sets forth the trade designation, % solids, generic chemical description, supplier and location of supplier for ingredients employed in the examples that have not previously been described with such detail.

TABLE I

| | | Ingredients | |
|---|---|---|---|
| Trade Designation | Wt % Solids | General Description | Supplier (Location) |
| | | Water-Borne Acrylic Polymers | |
| "Neocryl XK-90" | 45 | 100% Acrylic copolymer emulsion polymer (Tg ~ 3° C.) | Avecia, Wilmington, MA |
| "Neocryl XK-95" | 41 | Modified acrylic copolymer emulsion | Avecia |
| "Neocryl A-6015" | 45 | Modified acrylic emulsion | Avecia |
| "Neocryl XK-220" | 45 | 100% Acrylic latex polymer (Tg = 60° C.) | Avecia |
| "Neocryl A-1095" | 45 | Modified acrylic styrene copolymer dispersion | Avecia |
| "Neocryl A-550" | 40 | 100% Acrylic Resin (acid no. = 37, MFFT 100° C.) | Avecia |
| "Rhoplex GL-618" | 47 | All-acrylic, elastomeric polymer emulsion, Tg = 36° C. | Rohm and Haas Company ("Rohm and Haas"), Philadelphia, PA |
| "Lucidene 603" | 48.5 | 35–38% Acrylic/styrene copolymer and 12–14% polycarboxylate/styrene salt Tg = 11° C. | Rohm and Haas |
| "Lucidene 614" | 45.5 | Acrylic/styrene copolymer Tg = 38° C. | Rohm and Haas |
| "Lucidene 370" | 49 | Acrylic/styrene copolymer Tg = 103° C. | Rohm and Haas |

TABLE I-continued

Ingredients

| Trade Designation | Wt % Solids | General Description | Supplier (Location) |
|---|---|---|---|
| "Acronal Optive 310" | 45 | Styrene acrylic latex polymer | BASF, Charlotte, NC |
| "Neocar Acrylic 850" | 45 | Hydrophobic latex with ambient self-crosslinking, Tg = 50° C. | The Dow Chemical Company ("Dow"), Midland, MI |
| "Rhoplex AC-1035" | 46.5–47.5 | Acrylic polymer | Rohm and Haas |
| "Rhoplex E-2310H" | 45 +/− 1 | Styrene acrylic emulsion (self crosslinking), Tg = 45° C. | Rohm and Haas |
| "Ucar Latex 419" | 47–48 | Styrene acrylic polymer, Tg = −15° C. (midpoint) | Dow |
| *Optional Additives - Thickeners* | | | |
| "Acrysol RM-8W" | | Hydrophobically modified ethylene oxide urethane rheology modifier | Rohm and Haas |
| "Acrysol RM-5" | | Hydrophobically modified alkali acrylic thickener | Rohm and Haas |
| "Acrysol RM-6" | | Anionic acrylic alkali soluble emulsion associative thickener | Rohm and Haas |
| "Rheovis CR2" | | Associative thickener | Ciba Specialities, Hawthorne, NY |
| *Optional Additive - Surface Modifier* | | | |
| "BYK 307" | | Silicone surface additive | BYK-Chemie U.S.A., Wallingford, CT |
| "BYK 333" | | Polyether Modified Dimethyl Polysiloxane | BYK-Chemie U.S.A., Wallingford, CT |
| *Optional Additives - Solvents* | | | |
| "Eastman EB" | | Ethylene glycol monobutyl ether solvent | Eastman Chemical Company Kingsport, TN |
| "Dowanol DB" | | Diethylene glycol monobutyl ether solvent | Dow |
| "Dowanol EB" | | Ethylene glycol monobutyl ether solvent | Dow |
| AMP-95 | | 2-amino-2methyl-1-propanol | Dow |
| *Optional Additives - Surfactant* | | | |
| "Surfynol 104PA" | | Surfactant | Air Products & Chemicals Allentown, PA |
| "CoatOSil 1211" | | Organomodified polysiloxane blend surfactant | OSI Specialties, A Crompton Business Greenwich, CT |
| *Optional Additives - Adhesion Promoters* | | | |
| "Silquest Wetlink 78" | | Organosilane ester | OSI Specialties, A Crompton Business Greenwich, CT |
| "G6720" | | Glycidoxypropyltrimethoxysilane | United Chemical Technologies Bristol, PA |

Tables II and III, as follow, set forth the parts by weight of each ingredient employed in Formulations A-R used in Examples 1–23. Many of the water-borne acrylics as well as the modifying polymers contain about the same wt-% solids. Hence, the wt-% of the components of the dried coating (i.e. unreacted) is the same as in solution. For others, the relative proportions of the components in the dried coating can be calculated based on the wt-% solids of the starting ingredients.

being pulled through the gap, thus coating a wet layer of the formulation onto the viewing surface of the corona treated 3750 Sheeting.

TABLE II

Formulations A–I (Parts by weight)

| | A | B | C | D | E | F | G | H | I |
|---|---|---|---|---|---|---|---|---|---|
| Neocryl XK-90 | 100 | | | | | | | | |
| Neocryl XK-95 | | 100 | | | | | | | |
| Rhoplex GL-618 | | | 100 | | | | | | |
| Rhoplex AC-1035 | | | | | | | | | 100 |
| Neocryl A-6015 | | | | 100 | | | | | |
| Lucidene 603 | | | | | 70 | | | | |
| Lucidene 614 | | | | | | 100 | | | |
| Lucidene 370 | | | | | 30 | | | | |
| Acronal Optive 310 | | | | | | | 100 | | |
| Neocar Acrylic 850 | | | | | | | | 100 | |
| Acrysol RM-8W | 0.31 | | 0.22 | | | | 0.28 | 0.5 | 0.26 |
| Acrysol RM5 | | 0.87 | | | | | | | |
| Eastman EB | | | 2.0 | 13.5 | 6 | 6 | | 2 | |
| Deionized water | | | 2.0 | 5 | 6 | 6 | | 2 | |
| BYK 307 | | | | | | | | 0.1 | |

TABLE III

Formulations J–R (Parts by weight)

| | J | K | L | M | N | O | P | Q | R | S | T |
|---|---|---|---|---|---|---|---|---|---|---|---|
| Neocryl XK-90 | | 50 | | 93.75 | 100 | | | | | | |
| Neocryl XK-95 | | | | | | 100 | | 60 | 80 | 77.94 | 81.92 |
| Rhoplex E-2310H | 100 | | | | | | | | | | |
| Neocryl A-550 | | | | | | | | | 20 | | |
| Neocryl XK-220 | | 50 | 50 | | | | | 40 | | | |
| Michem Prime 4983R | | | 50 | | | | | | | | |
| Neorez R-9649 | | | | 6.25 | | | | | | | |
| Ucar Latex 419 | | | | | | | 100 | | | | |
| Acrysol RM-6 | | | | | | | 0.3 | 0.74 | 0.74 | 0.89 | 0.92 |
| Acrysol RM-8W | 0.5 | | | | | | | | | | |
| Rheovis CR2 | | | | 1.62 | | 0.74 | | | | | |
| Tinuvin 1130 | | | | 1.0 | | 1.0 | | | | 0.45 | 0.47 |
| Tinuvin 292 | | | | 0.5 | | 0.5 | | | | 0.45 | 0.47 |
| Deionized water | | 12.5 | 13.5 | 12.5 | | | | | | 18.91 | 12.98 |
| Dowanol DB | | 12.5 | 12.5 | 12.5 | | | | | | | |
| Crosslinker CX-100 | | | 1 | | | | | | | | 0.19* |
| AMP-95 | | | | | | | | | 0.34 | | |
| BYK-333 | | | | | | | | | | 0.27 | 0.28 |
| Surfynol 104PA | | | | | | | | | | 0.09 | 0.09 |
| IPA | | | | | | | | | | 1.0 | 2.68 |

*added just before coating

Examples 1–26

Example 1 was prepared by coating Formulation A in Table II onto sheeting commercially available from 3M under the trade designation "Scotchlite Reflective License Plate Sheeting No. 3750" ("3750 Sheeting").

The 3750 Sheeting was unwound from a stock roll and, in a continuous process, the viewing surface was air corona treated and immediately subsequently coated with Formulation A. The 3750 Sheeting was corona treated using an air corona bare roll treater with a ceramic electrode at a power of 1000 watts over a width of 20 inches at a web speed of 50 feet per minute (FPM), resulting in an energy level of 0.78 J/cm$^2$. The treated side of the 3750 Sheeting was then coated with Formulation A using a notched bar knife coater with a bar gap setting of 0.004 inches (4 mils). Formulation A was poured onto the 3750 Sheeting while the sheeting was Formulation A was dried by passing the 3750 Sheeting through a series of 5 ovens, each with a length of approximately 22 feet, using floatation drying techniques wherein the sheeting was supported on a cushion of air created by heated air flow directed against the moving sheeting both above and below the sheeting in a balanced fashion. Oven temperatures were set in ovens 1 through 5, respectively at 150° F., 200° F., 250° F., 250° F. and 250° F. After exiting the last oven, the 3750 Sheeting was transported to a winding device and wound up upon itself into a stock roll.

Examples 2–18 were prepared as described for Example 1, except using Formulation B through R, respectively and the processing conditions set out in Table IV. In the case of Examples 19 and 20 using Formulations S and T, only 3 ovens were employed having set temperatures of 150° F., 235° F. and 235° F. respectively.

TABLE IV

| Example No. | Formulation | 4th and 5th Zone Temp. (° F.) | Speed (FPM) | Bar Gap Setting (mils) | Calculated Corona Energy (J/cm$^2$) |
|---|---|---|---|---|---|
| 1  | A | 250 | 50  | 4   | 0.78 |
| 2  | B | 250 | 50  | 4   | 0.78 |
| 3  | C | 360 | 100 | 3   | 0.39 |
| 4  | D | 250 | 15  | 6   | 2.58 |
| 5  | E | 300 | 20  | 5   | 1.94 |
| 6  | F | 300 | 20  | 5   | 1.94 |
| 7  | G | 320 | 50  | 4   | 0.78 |
| 8  | H | 330 | 30  | 4   | 1.29 |
| 9  | I | 250 | 25  | 6   | 1.55 |
| 10 | J | 300 | 20  | 5   | 1.94 |
| 11 | K | 300 | 25  | 5   | 1.55 |
| 12 | L | 300 | 25  | 5   | 1.55 |
| 13 | M | 300 | 25  | 5   | 1.55 |
| 14 | N | 250 | 30  | 4   | 1.29 |
| 15 | O | 250 | 30  | 4   | 1.29 |
| 16 | P | 235 | 50  | 4   | 0.78 |
| 17 | Q | 235 | 50  | 4   | 0.78 |
| 18 | R | 235 | 50  | 4   | 0.78 |
| 19 | S |     | 50  | 5.5 | No treatment |
| 20 | T |     | 50  | 5.5 | No treatment |

Example 21 was prepared as described for Example 1, except that the corona energy was 0.5 J/cm$^2$ and within a day of corona treatment, the treated 3750 Sheeting was coated with a formulation prepared by combining 93.74 parts Rhoplex GL 618, 2.13 parts Dowanol EB, 3.90 parts deionized water and 0.23 parts Acrysol RM-8W and coating the formulation onto the treated 3750 Sheeting using a slot fed knife coater at a speed of 80 FPM, the coating was dried using 4 ovens which were set at 150° F., 225° F., 300° F. and 300+ F., respectively; the length of ovens 1, 2 and 3 was about 50 feet and the length of as about 100 feet.

Example 22 was prepared as described for Example 1, except that within a day of corona treatment, the treated 3750 Sheeting was coated with a formulation prepared by combining 99.54 parts Neocryl XK-95 and 0.46 parts Acrysol RM-6 and coating the formulation onto the treated 3750 Sheeting using a reverse gravure coating technique at a speed of 80 FPM; the coating was dried using 2 ovens, the first with a length of about 150 feet and set at 150° F. and the second with a length of about 70 feet and set at 250° F.

Example 23 was prepared as described for Example 1, except that 800 watts of corona treatment was employed to treat sheeting commercially available from 3M under the trade designation "Scotchlite Reflective License Plate Sheeting No. 3750 LP", the formulation coated was prepared by combining 68.5 wt-% Neocryl XK-90, 29.5 wt-% Neocryl A-1095, 0.50 wt-% Acrysol RM-6, 1.0 wt-% Tinuvin 1130 and 0.5 wt-% Tinuvin 292; the formulation was coated at a speed of 67 FPM; and the oven temperatures were set at 150° F./200° F./250° F./280° F./280° F.

Example 24 was prepared as described for Example 1, except that 1000 watts of corona treatment was employed and the 3750 Sheeting comprised a different adhesive and release liner on the uncoated surface. The viewing surface was coated with a formulation prepared by combining 62.64 parts by weight Neocryl XK-95, 0.05 parts Surfynol 104PA,; 6.96 parts Neocryl A-550, 0.94 parts IPA, 0.35 parts Tinuvin 292, 0.35 parts Tinuvin 1130, 0.06 parts BYK 333, 0.64 parts Acrysol RM-8W, 0.93 parts Acrysol RM-6 and 27.09 parts deionized water. Immediately prior to coating 0.61 parts CX-100 combined with 0.61 parts water was added to the formulation. The formulation was coated with a 6 mil bar gap setting, a line speed of 30 FPM and an oven temperatures were set at 100° F./235° F./235° F./235° F./100° F.

Example 25 was prepared as described for Example 24, except that the formulation was prepared by combining 75.58 parts by weight Neocryl XK-95, 0.04 parts Surfynol 104PA, 1.02 parts IPA, 0.38 parts Tinuvin 292, 0.38 parts Tinuvin 1130, 0.05 parts BYK 333, 0.71 parts Acrysol RM-8W and 21.85 parts deionized water. Immediately prior to coating 0.61 parts CX-100 combined with 0.61 parts water was added. The formulation was coated with the same line and oven temperatures as Example 24.

Example 26 was prepared as described in Example 24, except that the formulation was prepared by combining 69.32 parts Neocryl XK-95, 0.05 parts Surfynol 104PA, 0.93 parts IPA, 0.34 parts Tinuvin 292, 0.34 parts Tinuvin 1130, 0.05 parts BYK 333, 0.50 parts Acrysol RM-8W, 0.80 parts Acrysol RM-6, 0.96 parts orange pigment, 2.24 parts yellow pigment, and 24.47 parts deionized water. Immediately prior to coating 0.57 parts CX-100 combined with 0.57 parts water was added. The formulation was coated with the same line and oven temperatures as Example 24.

Example 27 was prepared as described in Example 1 except that the formulation was prepared by combining 95 parts Neocryl XK-90, 0.05 parts Surfynol 104PA, 0.94 parts IPA, 0.94 parts Tinuvin 1130, 0.09 parts BYK 333 and 0.80 parts Acrysol RM-6. Immediately prior to coating 0.86 parts CX-100 combined with 0.86 parts water was added.

This coating was coated onto a sheeting made according to U.S. Pat. No. 6,325,515 except that the overlay film was not attached. Instead the formulation was coated directly onto the polycarbonate cube corner layer after having been corona treated as described in Example 1. The formulation was coated with a 4 mil bar gap setting, a line speed of 40 FPM and an oven temperatures were set at 150° F./175° F./200° F./235° F./250°F.

From 1 to 10 days after coating, samples of the coated sheeting of Examples 1-27 were removed from the stock roll and tested accordingly to the previously described test methods. The samples were evaluated for retroreflective brightness, adhesion under dry room temperature conditions, adhesion immediately after conditioning in 100° F./100% relative humidity ("RH") environmental chamber, dry coating thickness, and gloss. The test values are provided in Table V.

The data in Table V show that for each of the formulations set forth in Tables II and III, the dried and optionally cured sheeting samples passed all tests, depicting the usefulness of the topcoat for retroreflective sheeting.

TABLE V

| Example No. | Formulation | Dry Adhesion (% Adhered) | Wet Adhesion (% Adhered) | Gloss | Brightness (CPL) | Thickness (mils) |
|---|---|---|---|---|---|---|
| 1 | A | 100 | 80  | 71 | 117 | 1.1 |
| 2 | B | 100 | 100 | 72 | 120 | 1.1 |
| 3 | C | 100 | 100 | 43 | 80  | 1.0 |

TABLE V-continued

| Example No. | Formulation | Dry Adhesion (% Adhered) | Wet Adhesion (% Adhered) | Gloss | Brightness (CPL) | Thickness (mils) |
|---|---|---|---|---|---|---|
| 4 | D | 100 | 95 | 78 | 68 | 1.6 |
| 5 | E | 100 | 100 | 64 | 85 | 1.4 |
| 6 | F | 100 | 90 | 86 | 87 | 1.5 |
| 7 | G | 100 | 90 | 66 | 100 | 1.2 |
| 8 | H | 100 | 100 | 65 | 103 | 1.1 |
| 9 | I | 100 | 100 | 84 | 79 | 2.6 |
| 10 | J | 100 | 100 | 64 | 103 | 1.5 |
| 11 | K | 100 | 100 | 53 | 90 | 1.5 |
| 12 | L | 100 | 100 | 39 | 82 | 0.9 |
| 13 | M | 100 | 100 | 48 | 90 | 1.3 |
| 14 | N | 100 | 100 | 53 | 123 | 1.5 |
| 15 | O | 100 | 100 | 57 | 130 | 1.6 |
| 16 | P | 100 | 100 | 74 | 90 | 1.4 |
| 17 | Q | 100 | 100 | 78 | 107 | 1.2 |
| 18 | R | 100 | 100 | 82 | 106 | 1.2 |
| 19 | S | 100 | 95 | 75 | 87 | 1.4–1.5 |
| 21 | — | 100 | 20 | 42.8 | 62 | 0.5 |
| 22 | — | 100 | 100 | 66.8 | 94.9 | 1.5 |
| 23 | — | 100 | 90 | 76 | 100 | 1.4 |
| 24 | — | 100 | 100 | 46 | 82 | 1.1 |
| 25 | — | 100 | 100 | 74 | 115 | 1.0 |
| 26 | — | 100 | 100 | 74 | 23.9 | ~1.0 |
| 27 | — | 100 | 100 | 91 | 1065 | 1.2 |

Note that Formulation T was not tested.

The impact resistance of Example 21 was also tested according ASTM D 2794-84 "Standard Test Method for Resistance of Organic Coatings to the Effects of Rapid Deformation (Impact)". The sheeting was found to pass an 80 inch-lb. force without cracking indicative of the embossability of sheeting having such coating for use as license plate sheeting.

Examples 28–35

Tables VI, as follow, set forth the parts by weight of each ingredient employed in Formulations U-AA used in Examples 28–35.

TABLE VI

Formulations U–AA (Parts by weight)

| | U | V | W | X | Y | Z | AA |
|---|---|---|---|---|---|---|---|
| Rhoplex GL-618 | 100 | 100 | 100 | 100 | 100 | 100 | 100 |
| Acrysol RM-8W | .18 | .18 | .18 | .18 | .18 | .18 | .18 |
| DI Water | 2 | 2 | 2 | | | | |
| Dowanol EB | 2 | 2 | 2 | | | | |
| CoatOSil 1211 | .1 | .1 | .1 | | | | |
| UCT G6720 | 1.04 | 3.12 | | | | | |
| Wetlink 78 | | | | 2 | 3 | 5.1 | |

Examples 28–35 were prepared as described for Example 1, except using Formulation U through AA, respectively and the processing conditions set out in Table VII.

TABLE VII

| Example No. | Formulation | 4th and 5th Zone Temp. (° F.) | Speed (FPM) | Bar Gap Setting (mils) |
|---|---|---|---|---|
| 28 | U | 250 | 50 | 4 |
| 29 | V | 250 | 50 | 4 |
| 30 | W | 250 | 50 | 4 |
| 31 | X | 250 | 50 | 4 |
| 32 | Y | 250 | 50 | 4 |
| 33 | Z | 250 | 50 | 4 |
| 34 | AA | 250 | 50 | 4 |
| 35 | AA | 330 | 70 | 4 |

Examples 28–35 were evaluated for retroreflective brightness, adhesion under dry room temperature conditions, adhesion immediately after conditioning in 100° F./100% relative humidity ("RH") environmental chamber, dry coating thickness, and gloss. The test values are provided in Table VIII.

TABLE VIII

| Example No. | Formulation | Dry Adhesion (% Adhered) | Wet Adhesion (% Adhered) | Gloss | Brightness (CPL) | Thickness (mils) |
|---|---|---|---|---|---|---|
| 28 | U | 100 | 100 | 71 | 115 | 1.1 |
| 29 | V | 100 | 100 | 72 | 108 | 1.1 |
| 30 | W | 100 | 0 | 43 | 114 | 1.1 |
| 31 | X | 100 | 90 | 78 | 114 | 1.1 |
| 32 | Y | 100 | 100 | 64 | 112 | 1.1 |
| 33 | Z | 100 | 100 | 86 | 117 | 1.1 |
| 34 | AA | 100 | 0 | 66 | 114 | 1.1 |
| 35 | AA | 25 | 80 | 60 | 110 | 1.1 |

The results in Table VIII show that Examples 28–29 and 31–33 passed the wet adhesion test and gloss test due to the inclusion of a silane adhesion promoting agent.

Examples 36–39

For Examples 36 and 37 Formulations 2 and 4 of Table A were dried and cured on a releasable liner in the manner described in the Preparation of Films test method and printed prior to being heat laminated to 3750 sheeting. For Examples 38 and 39, the topcoat was dried and cured on 3750 sheeting in the manner described in the Tensile test method.

The topcoat either disposed on the releasable liner (i.e. Examples 36 and 37) or disposed on the sheeting (i.e. Examples 38 and 39) was digital printed with a thermal mass transfer printer commercially available from Zebra Technologies Corporation, Vernon Hills, Ill. under the trade designation "Zebra model 170xi" using a thermal transfer ribbon commercially available from International Imaging Materials Inc., Amherst, N.Y. under the trade designation "Black DC-300 Specialty Resin Thermal Transfer Ribbon". The print head spring tension was set at mid range, the printer darkness setting was 30 on a scale of 1–30, and the printing speed was 2 inches/second. The imaged test pattern included large characters, small characters, bar codes, and blocks of solid and graduated tones.

After printing the quality of the imaged was evaluated by print quality was rated visually on a scale of 1 to 7, with 1 being best. The results were as follows:

| Example | Formulation | Rating |
| --- | --- | --- |
| Example 36 | 4 | 2 |
| Example 37 | 2 | 3 |
| Example 38 | 2 | 4 |
| Example 39 | 4 | 4 |

The print adhesion was evaluated using the 610 Tape Snap Test as subsequently described in Example 40 except that the % print removal is reported. The results are as follows:

| Example | Formulation | Print Removal |
| --- | --- | --- |
| Example 36 | 4 | none |
| Example 37 | 2 | none |
| Example 38 | 2 | 10% |
| Example 39 | 4 | 10% |

Examples 36–39 show that topcoats of the invention are suitable for imaging via thermal mass transfer printing techniques.

Examples 40–41

Formulations 17 and 18 of Table B were dried and cured on 3750 sheeting in the manner described in the Tensile test method. The resulting sheeting was digital printed with a laser printer commercially available from Minolta-QMS, Mobile, Ala., under the trade designation "QMS 2560 laser printer".

Print Quality tests were conducted according to the method described in WO 00/58930 A1. Samples were rated as "poor" or "good" based on completeness of the character fill and smoothness of its edges. A sample rated as "good" demonstrated "complete fill" of the character, i.e. within the character there were no holes where one would be able to see down to the substrate below and smooth character edges as opposed to jagged.

Brightness of the retroreflective material was measured prior to and after being passed through the laser printer at an observation angle of 0.2 degrees and an entrance angle of −4 degrees.

610 Tape Snap Tests were conducted using tape commercially available from 3M Company ("3M"), St. Paul, Minn. under the trade designation "Scotch Brand Tape No. 610".

A scrub test was conducted according to the method described in WO 0058930 A1. Again, samples were rated pass/fail based upon whether the samples retained legibility after scrubbing for 1000 cycles.

Gasoline resistance tests were conducted according to the method described under solvent resistance in WO 0058930 A1. Samples were rated pass/fail, based upon abrasion of the printed areas. A pass was given to samples that did not show abrasion in printed areas to the extent that the substrate below was observable.

The results are in Table IX as follows:

TABLE IX

| Example (Formulation) | Print Quality | Initial Brightness | Brightness after printing | 610 Tape Snap Test | Scrub Test | Gasoline Resistance 25 dbl rubs |
| --- | --- | --- | --- | --- | --- | --- |
| 40 (17) | good | 90 | 56 | none removed | pass | fail |
| 41 (18) | good | 84 | 73 | none removed | pass | pass |

Examples 40–41 show that topcoats of the invention are suitable for imaging via laser printing techniques.

Example 42

Example 42 was prepared as described for Example 1, except that 1600 watts of corona treatment was employed and the 3750 Sheeting comprised a different adhesive and release liner on the uncoated surface. The viewing surface was coated with a formulation prepared by combining 67 parts by weight Neocryl XK-90, 0.1 parts Surfynol 104PA, 0.5 parts IPA, 0.337 parts Tinuvin 292, 0.674 parts Tinuvin 1130, 0.1 parts BYK 333, 2.5 parts Acrysol RM-6, and 26.389 parts deionized water. Immediately prior to coating 0.67 parts CX-100 combined with 0.67 parts water was added to the formulation. The formulation was coated with a 6 mil bar gap setting, a line speed of 100 FPM and an oven temperatures were set at 80° F./160° F./235° F./235° F./250° F.

The coated sheeting was found to hotstamp well with a hot stamper commercially available from Utsch, Siegen, Germany under the trade designation Utsch HMMFRB at a set temperature 225° C. using a foil commercially available from Kurz-Hastings, Inc., Furth, Germany under the trade designations "720263".

Comparative Examples

Comparative Example C1 was prepared as described in Example 1 except that 1000 watts of corona treatment was employed and the speed was 30 FPM resulting in an energy level of 1.29 J/cm2. The viewing surface was coated with a formulation prepared by 95.2 parts by weight combining an acrylic emulsion commercially available Noveon Inc, under the trade designation Carboset GA2136, 0.91 parts of Acrylsol RM-8W, 0.05 parts Surfynol 104PA, 0.95 parts Isopropyl alcohol, 0.48 parts Tinuvin 1130, 0.48 parts Tinuvin 292, and 0.10 parts BYK 333. Immediately prior to coating, 0.915 parts of CX100 combined with 0.915 parts of water was added to the formulation. The formulation was coated with a 4 mil bar gap setting, and ovens set at 150° F./180° F. /230° F./300° F./300° F.

Comparative Example C2 was prepared as described in Comparative Example C1 except the viewing surface was coated with a formulation prepared by combining 96.68 parts by weight of Neocryl A-612 (a 100% acrylic emulsion polymer having a Tg of 74° C. as reported by the supplier, commercially available from Avecia), 0.05 parts Surfynol 104PA, 0.97 parts Isopropyl Alcohol, 0.48 parts Tinuvin 1130, 0.48 parts Tinuvin 292, and 0.10 parts of BYK 333. Immediately prior to coating, 0.62 parts of CX100 combined with 0.62 parts of water was added to the formulation. The formulation was coated with a 4 mil bar gap setting, and ovens set at 150° F./180° F./230° F. /300° F. /300° F.

Comparative Example C3 was prepared as described in Comparative Example C1 except that 1000 watts of corona treatment was employed and the speed was 20 FPM resulting in an energy level of 1.94 J/cm2, and the formulation was coated with a 4 mil bar gap setting, and ovens set at 100° F./100° F. /150° F. /200° F. /235° F.

Comparative Example C4 was prepared as described in Comparative Example C2 except that 1000 watts of corona treatment was employed and the speed was 20 FPM resulting in an energy level of 1.94 J/cm2, and the formulation was coated with a 4 mil bar gap setting, and ovens set at 100° F./100° F. /150° F. /200° F. /235° F.

The comparative examples C1–C4 were evaluated for retroreflective brightness, adhesion under dry room temperature conditions, adhesion immediately after conditioning in 100° F./100% relative humidity ("RH") environmental chamber, dry coating thickness, and gloss. The test values are provided in Table X.

TABLE X

| Comparative Example No. | Dry Adhesion (% Adhered) | Wet Adhesion (% Adhered) | Gloss | Brightness (CPL) | Thickness (mils) |
|---|---|---|---|---|---|
| C1 | 100 | 100 | 73 | 96 | 1.1 |
| C2 | 100 | 100 | 32 | 57 | 0.9 |
| C3 | 100 | 0 | 88 | 87 | 1.2 |
| C4 | 100 | 0 | 59 | 79 | 0.7 |

The data in Table X shows that crosslinked formulations based on either Carboset GA2136 or Neocryl A-612 exhibit poor wet adhesion at low drying temperature. Further the formulations based on Neocryl A-612 exhibited low gloss and low brightness as well as a relatively high VOC content. Although C1 exhibited sufficient adhesion, gloss, and brightness, as previously discussed this formulation was found to exhibit surface impression defects due to being too soft.

What is claimed is:

1. A retroreflective article comprising
   a core sheet having a viewing surface wherein the core sheeting comprises retroreflective elements; and
   a topcoat disposed on the viewing surface;
wherein the topcoat consists essentially of at least one dried and optionally cured water-borne acrylic polymer, the topcoat is substantially free of filler, and the topcoat has an elastic modulus when tested with nanoindentation ranging from 0.2 GPa to 2.0 GPa.

2. The retroreflective article of claim 1 wherein the thickness of the topcoat ranges from about 0.5 mils to about 3 mils.

3. The retroreflective article of claim 1 wherein the 60° gloss is at least about 40.

4. The retroreflective article of claim 1 wherein the dry adhesion is at least 90%.

5. The retroreflective article of claim 1 wherein the wet adhesion is at least 20%.

6. The retroreflective article of claim 1 wherein the wet adhesion is at least 80%.

7. The retroreflective article of claim 1 wherein the topcoat is disposed directly on the core sheet.

8. The retroreflective active article of claim 1 wherein the topcoat is exposed on the viewing surface of the sheeting.

9. The retroreflective article of claim 1 wherein a primer is disposed adjacent the topcoat.

10. The retroreflective article of claim 9 wherein a primer is disposed on the core sheet and the topcoat is disposed on the primer.

11. The retroreflective article of claim 9 wherein the primer is disposed on the topcoat and the primer is exposed on the viewing surface of the sheeting.

12. The retroreflective article of claim 1 wherein the article further comprises an adhesive layer disposed between the core sheet and the topcoat.

13. The retroreflective article of claim 1 wherein the sheeting is a white embedded-lens microsphere-based sheeting and the sheeting exhibits a retroreflected brightness of at least 50 candelas per lumen when measured at 0.2° observation angle and −4° entrance angle.

14. The retroreflective article of claim 7 wherein the sheeting comprises glass microspheres and a binder layer.

15. The retroreflective article of claim 14 wherein the binder comprises polyvinyl butyral, aliphatic polyurethane or polyurethane extended polyester polymers.

16. The retroreflective article of claim 1 wherein retroreflective article is an encapsulated lens sheeting.

17. The retroreflective article of claim 16 wherein the core sheet comprises cube corner microstructures.

18. The retroreflective article of claim 16 wherein the retroreflective article comprises microspheres present substantially as a monolayer with an underlying specular reflective layer.

19. The retroreflective article of claim 1 wherein the topcoat comprises at least one thickener.

20. The retroreflective article of claim 1 wherein the topcoat comprises at least one ultraviolet light absorber.

21. The retroreflective article of claim 1 wherein the topcoat is digitable printable by at least one method selected from laser printing, ink-jet printing, and thermal mass transfer printing.

22. The retroreflective article of claim 1 wherein the sheeting further comprises a graphic.

23. The retroreflective article of claim 22 wherein the graphic is disposed on the topcoat and exposed on the viewing surface of the sheeting.

24. The retroreflective article of claim 22 wherein the graphic is disposed between the topcoat and the viewing surface of the sheeting.

25. A retroreflective article comprising
   a core sheet having a viewing surface wherein the core sheeting comprises retroreflective elements; and
   a topcoat disposed on the viewing surface;

wherein the topcoat consists essentially of at least one dried and optionally cured water-borne acrylic polymer, the topcoat is substantially free of filler, and the topcoat has a hardness when tested with nanoindentation of at least 0.1 GPa.

26. A retroreflective article comprising
    a core sheet having a viewing surface wherein the core sheeting comprises retroreflective elements; and
    a topcoat disposed on the viewing surface;
wherein the topcoat consists essentially of at least one dried and optionally cured water-borne acrylic polymer, the topcoat is substantially free of filler, and the topcoat has an energy per volume at break of greater than 30 ft*lbf/in³.

27. A retroreflective article comprising
    a core sheet having a viewing surface wherein the core sheeting comprises retroreflective elements; and
    a topcoat disposed on the viewing surface;
wherein the topcoat consists essentially of at least one dried and optionally cured water-borne acrylic polymer, the topcoat is substantially free of filler, and the topcoat has at least two second heat midpoint glass transition temperatures according to ASTM E 1356-98 wherein the first glass transition temperature ranges from about 70° C. to about 95° C. and the second glass transition temperature ranges from about 0° C. to about 35° C.

28. A retroreflective article comprising
    a core sheet having a viewing surface wherein the core sheeting comprises retroreflective elements; and
    a topcoat disposed on the viewing surface;
wherein the topcoat consists essentially of at least one dried and optionally cured water-borne acrylic polymer, the topcoat is substantially free of filler, and the topcoat has at least three second heat midpoint glass transition temperatures according to ASTM E-1356-98 wherein the first glass transition temperature ranges from about 90° C. to about 95° C., the second glass transition ranges from about 120° C. to about 130° C., and the third glass transition is less than –5° C.

29. The retroreflective article of claim 28 wherein the third glass transition temperature is less than about –10° C.

30. The retroreflective article of claim 28 wherein the third glass transition temperature is less then about –15° C.

31. A method of making a retroreflective article comprising:
    providing core sheet comprising retroreflective elements having a viewing surface and an opposing surface;
    applying an aqueous topcoat composition wherein the topcoat is substantially free of filler;
    to said viewing surface; and
    drying and optionally curing the topcoat;
wherein the topcoat composition consists essentially of at least one water-borne acrylic polymer and the dried and optionally cured topcoat composition has an elastic modulus when tested with nanoindentation ranging from 0.2 GPa to 2.0 GPa.

32. A retroreflective article of claim 31 wherein the topcoat comprises a volatile organic content ("VOC") of less than about 250 grams/liter as determined by ASTM D2369-81.

* * * * *

UNITED STATES PATENT AND TRADEMARK OFFICE
CERTIFICATE OF CORRECTION

PATENT NO. : 7,048,989 B2
APPLICATION NO. : 10/417642
DATED : May 23, 2006
INVENTOR(S) : Watkins, Robert F.

It is certified that error appears in the above-identified patent and that said Letters Patent is hereby corrected as shown below:

Title Page, Page 2, Col. 2, (Other Publications)
Line 2, Delete "Rhom" and insert - - Rohm - -, therefor.
Section (75) Inventors, delete "Cottage Grove, MN" and insert –Prescott, WI—therefore.

Column 2
Line 49, delete "–10° C." and insert - - –10° C., - -, therefor.

Column 6
Line 41, delete "(e.g.iner)" and insert - - (e.g. liner) - -, therefor.

Column 7
Line 42, Delete "mount" and insert - - amount - -, therefor.

Column 8
Line 41, Delete "polymers," and insert - - polymers - -, therefor.

Column 10
Line 5, Delete "MJ/m3)," and insert - - MJ/m$^3$), - -, therefor.

Column 11
Line 51, Delete "The." and insert - - The - -, therefor.

Column 13
Line 7, Delete "1.0%." and insert - - 1.0%, - -, therefor.
Line 44, Delete "rade" and insert - - trade - -, therefor.

Column 15
Line 27, Delete "PR48:2," and insert - - PR 48:2, - -, therefor.

Column 15
Line 33, Delete "IT"." and insert - - II". - -, therefor.

Column 18
Line 40, Delete "(Bums);" and insert - - (Burns); - -, therefor.
Line 61, Delete "1DB112ME." and insert - - 1DB–112ME. - -, therefor.

Column 19
Line 50, Delete "0.20" and insert - - 0.2° - -, therefor.

UNITED STATES PATENT AND TRADEMARK OFFICE
CERTIFICATE OF CORRECTION

PATENT NO. : 7,048,989 B2
APPLICATION NO. : 10/417642
DATED : May 23, 2006
INVENTOR(S) : Watkins, Robert F.

It is certified that error appears in the above-identified patent and that said Letters Patent is hereby corrected as shown below:

Column 21-22
Line 2, Table I, Delete "Wt %" and insert - - Wt-% - -, therefor.

Column 23-24
Line 2, Table I, Delete "Wt %" and insert - - Wt-% - -, therefor.

Column 27
Line 32, Delete "FPM," and insert - - FPM; - -, therefor.
Line 34, Delete "300+" and insert - - 300° - -, therefor.
Line 35, Delete "as" and insert - - oven 4 was - -, therefor.

Column 28
Line 3, Delete "104PA,;" and insert - - 104PA, - -, therefor.

Column 34
Line 17, In Claim 8, after "retroreflective" delete "active".

Signed and Sealed this

Twenty-second Day of August, 2006

JON W. DUDAS
*Director of the United States Patent and Trademark Office*